(12) United States Patent
Tanaka et al.

(10) Patent No.: US 12,028,492 B2
(45) Date of Patent: Jul. 2, 2024

(54) READING APPARATUS AND RECORDING APPARATUS

(71) Applicant: CANON KABUSHIKI KAISHA, Tokyo (JP)

(72) Inventors: Gakushi Tanaka, Kanagawa (JP); Toru Yada, Kanagawa (JP); Yuji Kagami, Kanagawa (JP); Yasuhito Tsubakimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 17/669,997

(22) Filed: Feb. 11, 2022

(65) Prior Publication Data
US 2022/0263959 A1 Aug. 18, 2022

(30) Foreign Application Priority Data

Feb. 17, 2021 (JP) .................................. 2021-023609

(51) Int. Cl.
| | |
|---|---|
| *H04N 1/00* | (2006.01) |
| *B41J 29/02* | (2006.01) |
| *B41J 29/393* | (2006.01) |
| *H04N 1/10* | (2006.01) |

(52) U.S. Cl.
CPC .......... *H04N 1/00535* (2013.01); *B41J 29/02* (2013.01); *B41J 29/393* (2013.01); *H04N 1/00543* (2013.01); *H04N 1/00798* (2013.01); *H04N 1/1043* (2013.01); *H04N 1/1061* (2013.01); *H04N 2201/0081* (2013.01)

(58) Field of Classification Search
CPC .......... H04N 1/00535; H04N 1/00543; H04N 1/00798; H04N 1/1043; H04N 1/1061; H04N 2201/0081; B41J 29/02; B41J 29/393; B41J 29/13
See application file for complete search history.

(56) References Cited

U.S. PATENT DOCUMENTS 8,023,859 B2 9/2011 Matsumoto .................... 399/110

FOREIGN PATENT DOCUMENTS

JP 2009-290515 12/2009

OTHER PUBLICATIONS

Nishinohara; Image Reading and Recording Apparatus, Aug. 19, 2004, Japan, All Pages (Year: 2004).*
Makai, Takaro, Multifunctional Device, Sep. 16, 2015, China, All Pages (Year: 2015).*

* cited by examiner

*Primary Examiner* — Justin Seo
*Assistant Examiner* — Tracey M McMillion
(74) *Attorney, Agent, or Firm* — Venable LLP

(57) ABSTRACT

A reading apparatus comprising a lower case, a reading portion, a drive portion and a stay is used. The reading portion moves between an open position in which the lower case is open and a closed position in which the lower case is closed and accommodates a reading sensor. The drive portion moves the reading sensor in a moving direction. The stay is coupled to the reading portion rotatably in one end and coupled to the lower case rotatably in the other end and moves a rotation shaft with in a direction orthogonal to the shaft. The drive portion is located outside a movable range of the reading sensor. When the reading portion is in the closed position, the stay is disposed in an area in which the stay overlaps the drive portion in the moving direction and overlaps the drive portion in height direction.

24 Claims, 37 Drawing Sheets

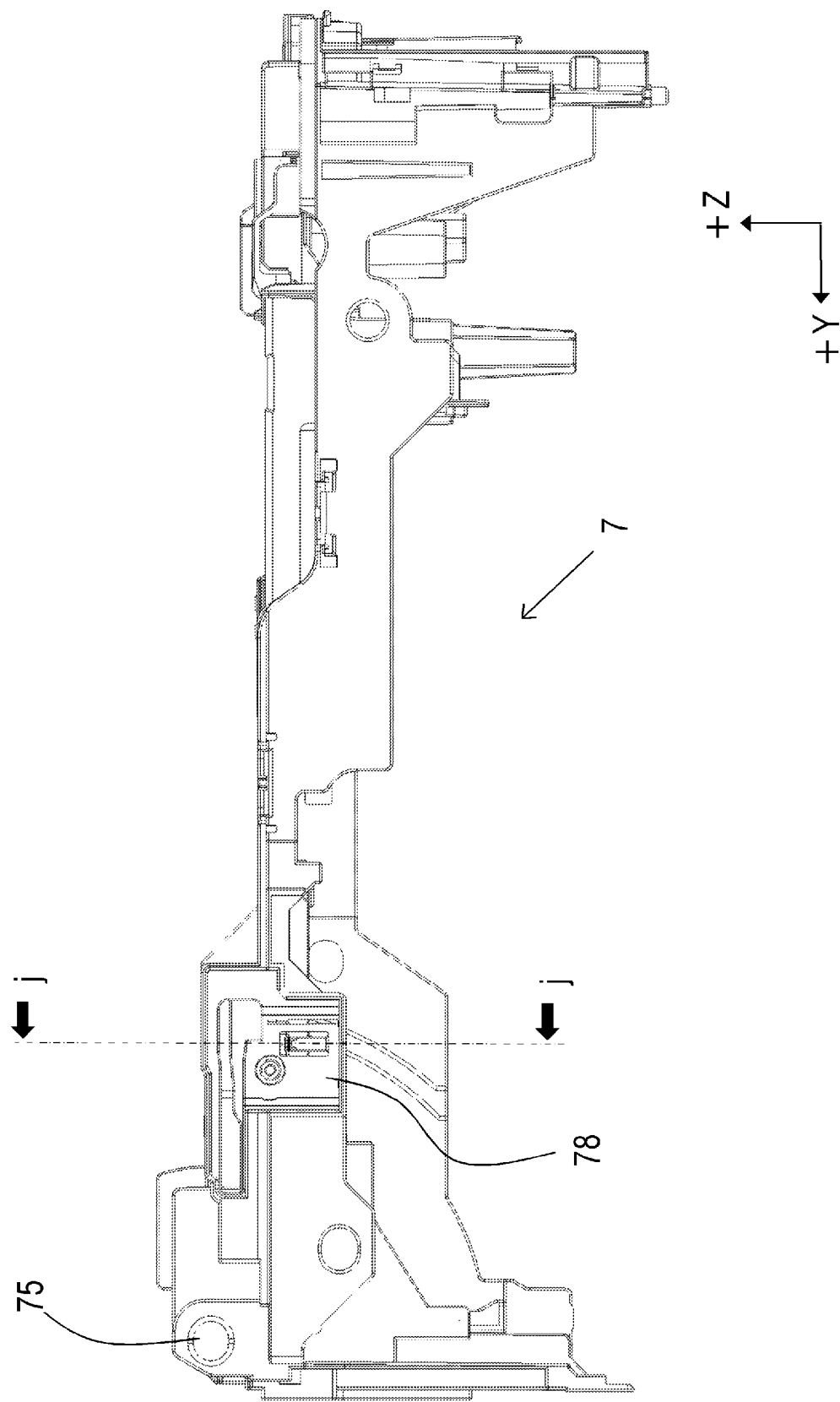

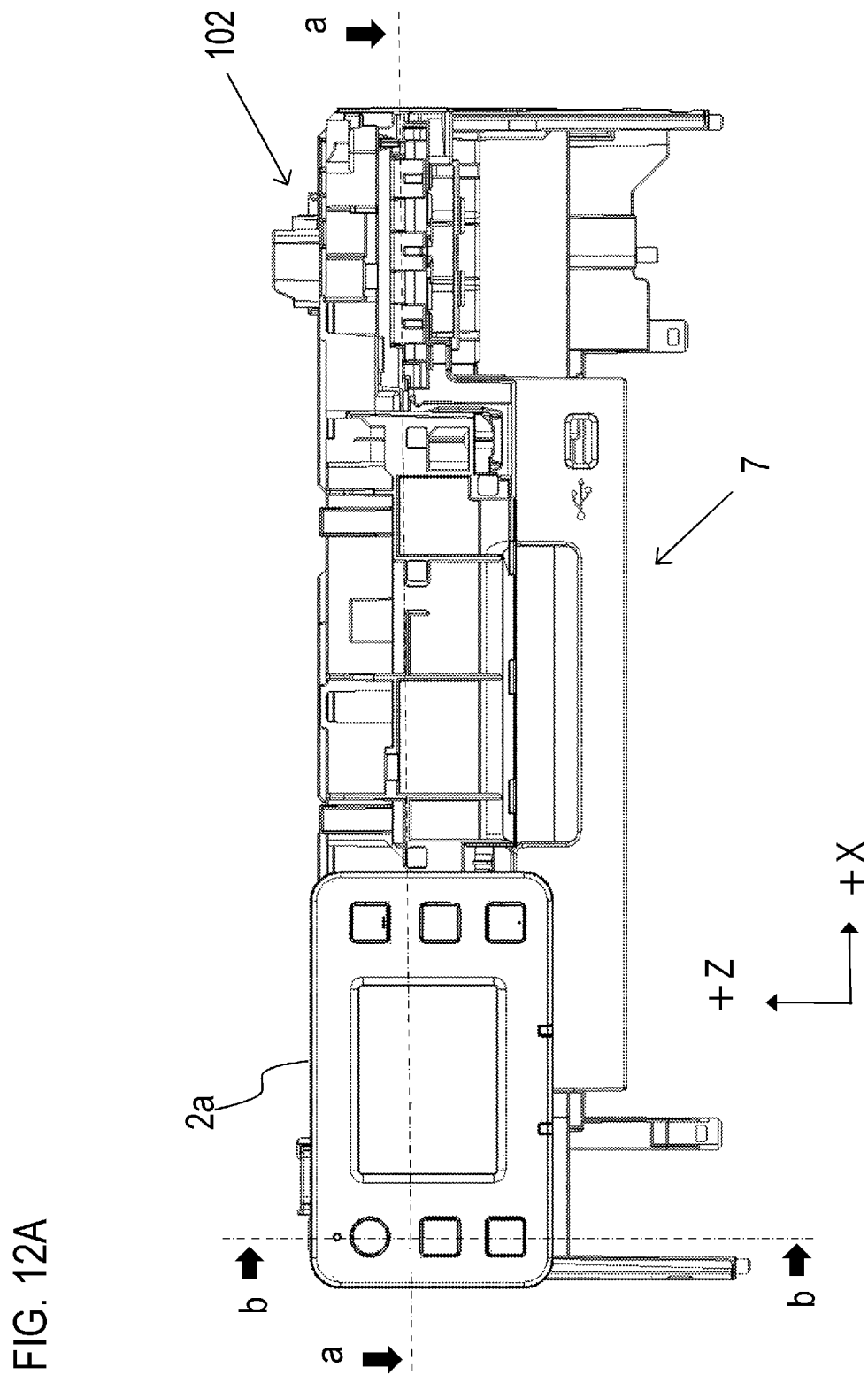

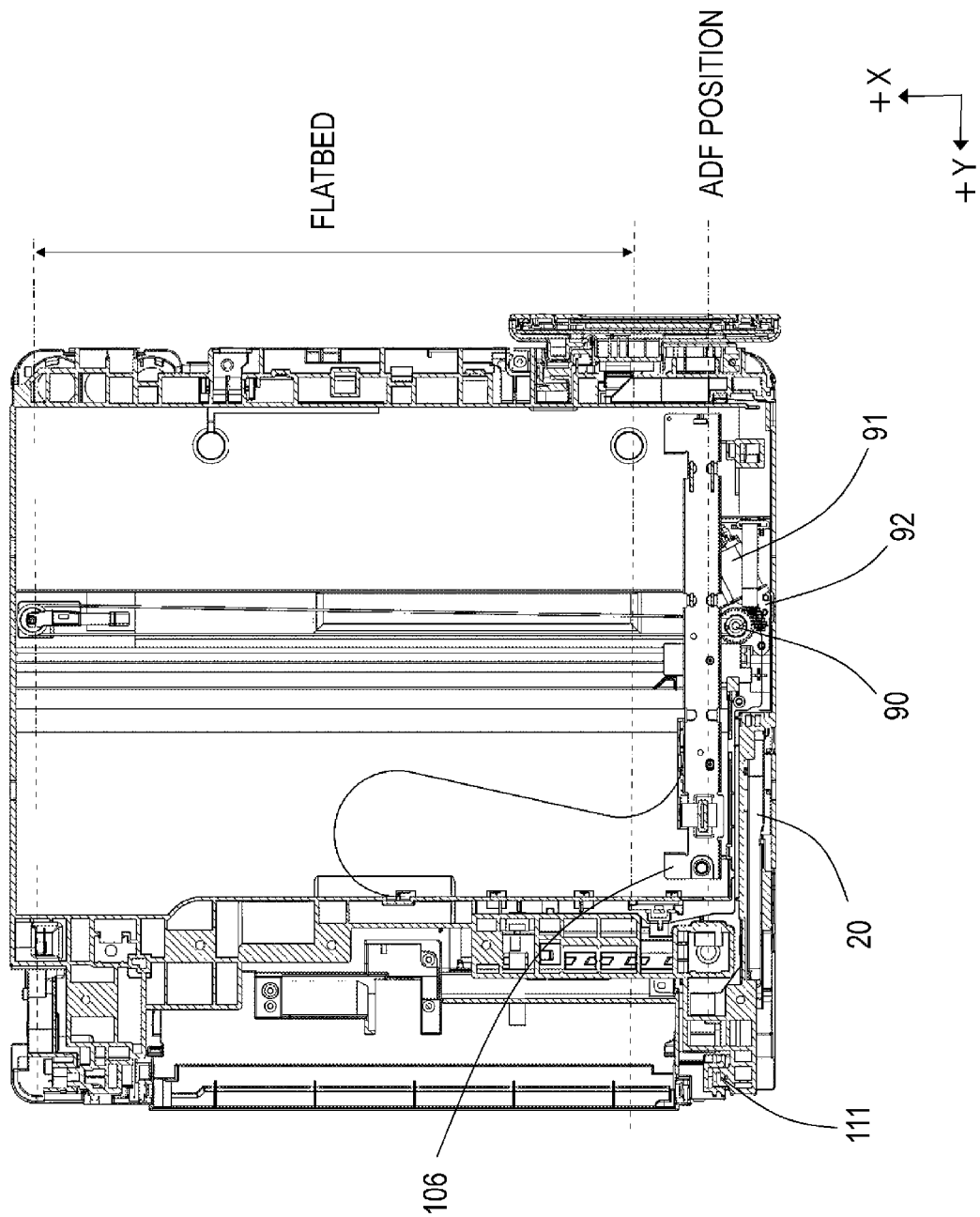

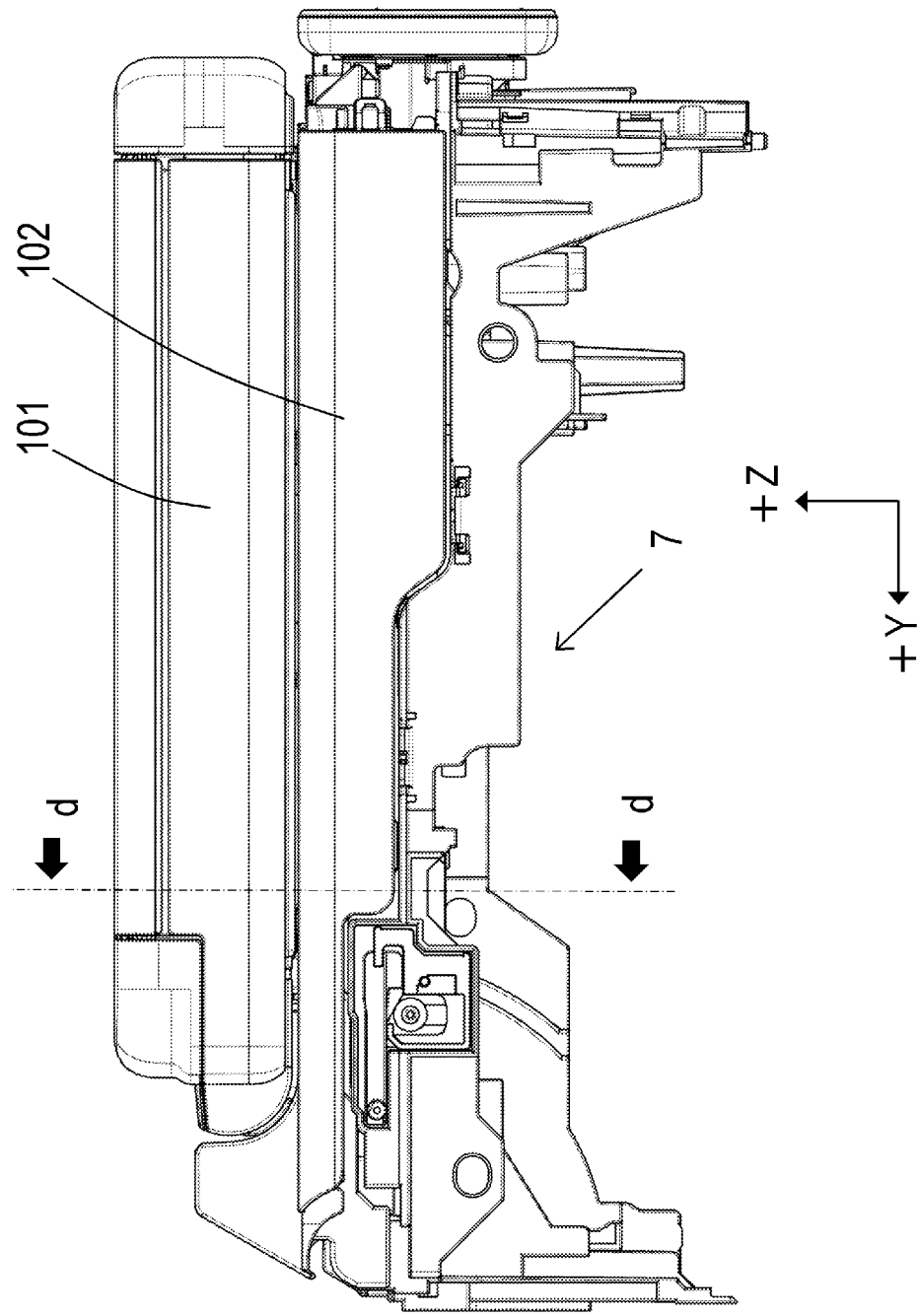

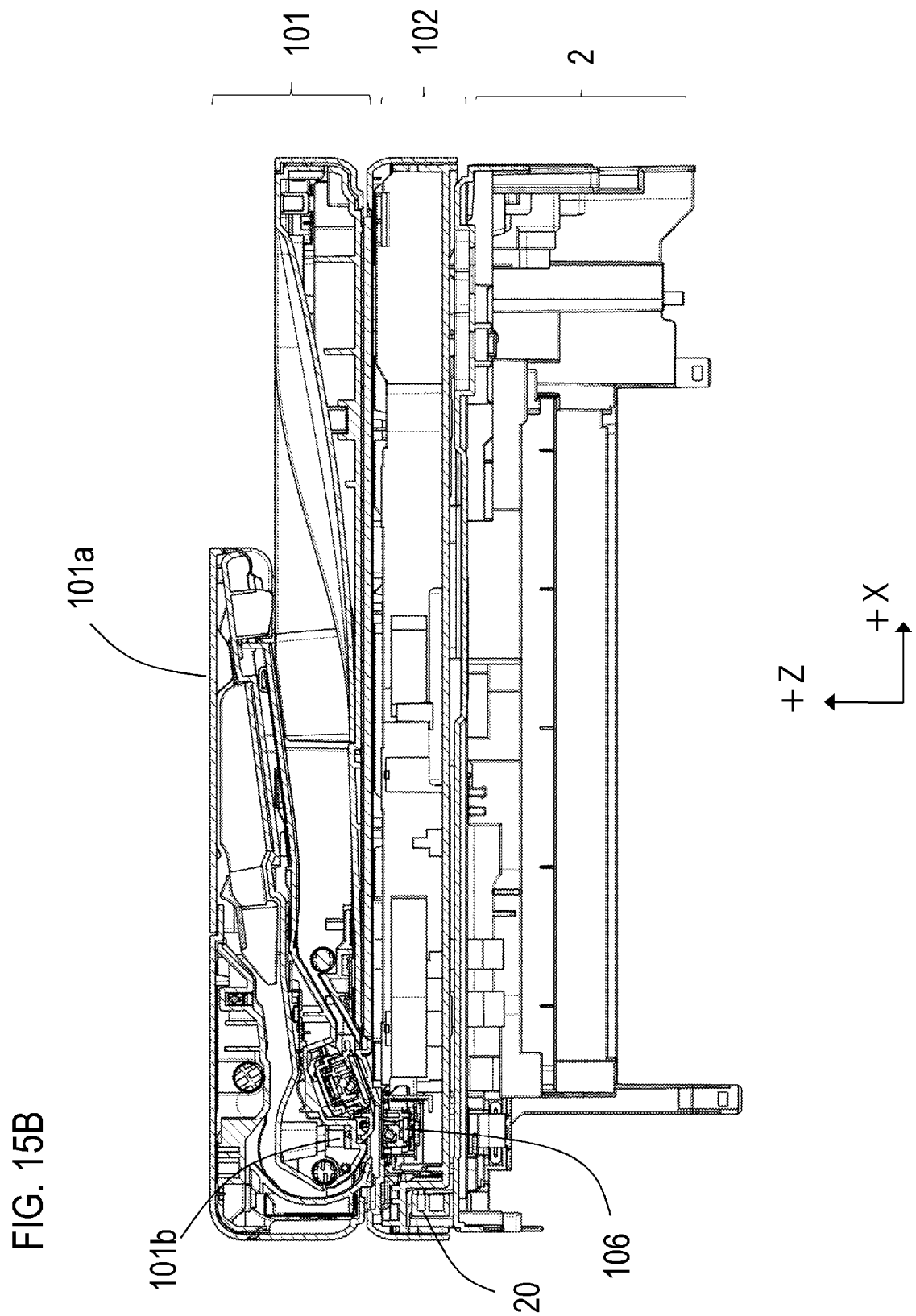

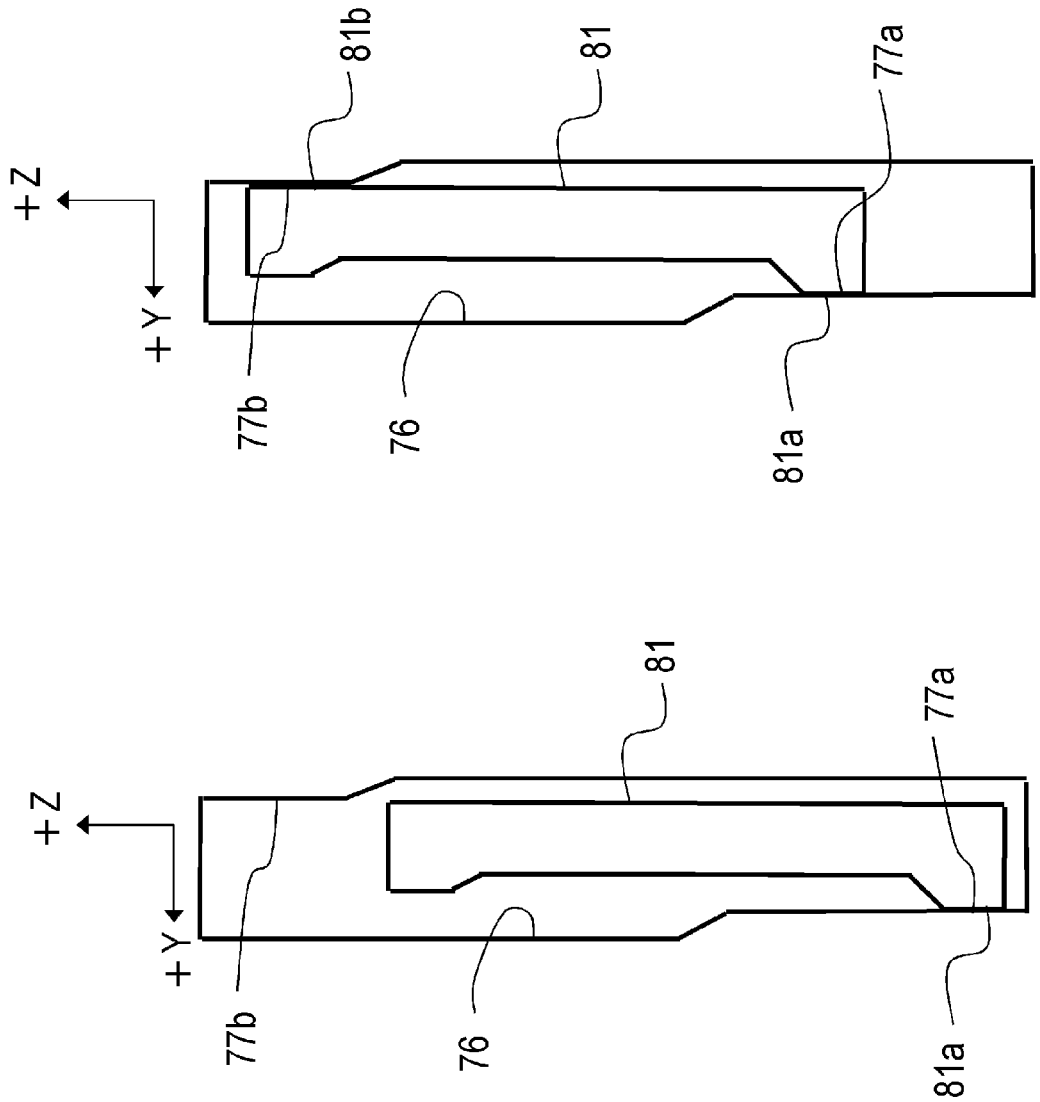

READING APPARATUS AND RECORDING APPARATUS

BACKGROUND OF THE INVENTION

Field of the Invention

The present invention relates to a recording apparatus which includes a reading portion, which reads an image from a document, above a recording portion which records an image on a recording material such that the reading portion is openable and closable.

Description of the Related Art

Conventionally, as a recording apparatus which has a scanner function and a copier function in addition to a printer function, there is known a recording apparatus including a recording portion which records an image on a recording material such as a sheet, and a reading portion which reads an image from a document. In addition, as a typical apparatus configuration of such a recording apparatus, there is known a configuration in which a reading portion is attached to a lower case, in which a recording portion is disposed, such that the reading portion is openable and closable (Japanese Patent Application Publication No. 2009-290515). In such a configuration, jam processing and maintenance operation in the lower case in which the recording portion is disposed are often allowed by bringing the reading portion into an open state.

SUMMARY OF THE INVENTION

The opening-closing configuration described above needs a coupling mechanism such as a coupling stay which couples the reading portion to the lower case such that the reading portion is openable and closable, and a lock mechanism for maintaining an open state of the reading portion, and these mechanical portions are usually provided so as to be accommodated in the case. As a result, in particular, a space for disposing the apparatus configuration in the lower case, in which the recording portion is accommodated, is limited, which makes it difficult to secure the space and also achieve a reduction in the size of the apparatus at the same time.

An object of the present invention is to provide a technique capable of increasing flexibility of layout of an apparatus configuration in the apparatus configuration in which a reading portion is openable and closable with respect to a recording portion, and allowing a reduction in the size of an apparatus.

In order to solve the above-described problem, a reading apparatus of the present invention includes:
a lower case;
a reading portion configured to move, above the lower case about a rotation shaft, between an open position in which the lower case is open and a closed position in which the lower case is closed, and accommodate a reading sensor for reading an image from a document;
a drive portion provided in the reading portion and configured to move the reading sensor in a moving direction; and
a stay coupled to the reading portion rotatably in one end, and coupled to the lower case rotatably and so as to be able to move a position of a rotation shaft with respect to the lower case in a direction orthogonal to the rotation shaft in the other end; wherein
the drive portion is located outside a movable range of the reading sensor in the moving direction, and
when the reading portion is in the closed position, the stay is disposed in an area in which the stay overlaps the drive portion in the moving direction and the stay overlaps the drive portion in height direction.

Also, a recording apparatus of the present invention includes:
a recording portion configured to record an image on a recording material;
a lower case provided in the recording portion;
a reading portion configured to move, above the lower case about a rotation shaft, between an open position in which the lower case is open and a closed position in which the lower case is closed, and accommodate a reading sensor for reading the image from a document;
a drive portion provided in the reading portion and configured to move the reading sensor in a moving direction; and
a stay coupled to the reading portion rotatably in one end, and coupled to the lower case rotatably and so as to be able to move a position of a rotation shaft with respect to the lower case in a direction orthogonal to the rotation shaft in the other end, wherein
the drive portion is located outside a movable range of the reading sensor in the moving direction, and
when the reading portion is in the closed position, the stay is disposed in an area in which the stay overlaps the drive portion in the moving direction and the stay overlaps the drive portion in height direction.

According to the present invention, it is possible to increase the flexibility of the layout of the apparatus configuration in the apparatus configuration in which the reading portion is openable and closable with respect to the recording portion, and allow the reduction in the size of the apparatus.

Further features of the present invention will become apparent from the following description of exemplary embodiments with reference to the attached drawings.

BRIEF DESCRIPTION OF THE DRAWINGS

FIG. 10A is a side view of a frame member.

FIG. 12A is a front view of the scanner portion;

FIG. 12B is a cross-sectional view of the scanner portion and the stay member;

FIG. 15A is a side view of the scanner portion and the ADF;

FIG. 15B is a cross-sectional view of the scanner portion and the ADF;

FIGS. 20A and 20B are each a schematic view in which a guide portion between the frame member and the opening member is enlarged and shown.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Each of the embodiments of the present invention described below can be implemented solely or as a combination of a plurality of the embodiments or features thereof where necessary or where the combination of elements or features from individual embodiments in a single embodiment is beneficial.

Embodiment 1

Figure 1:
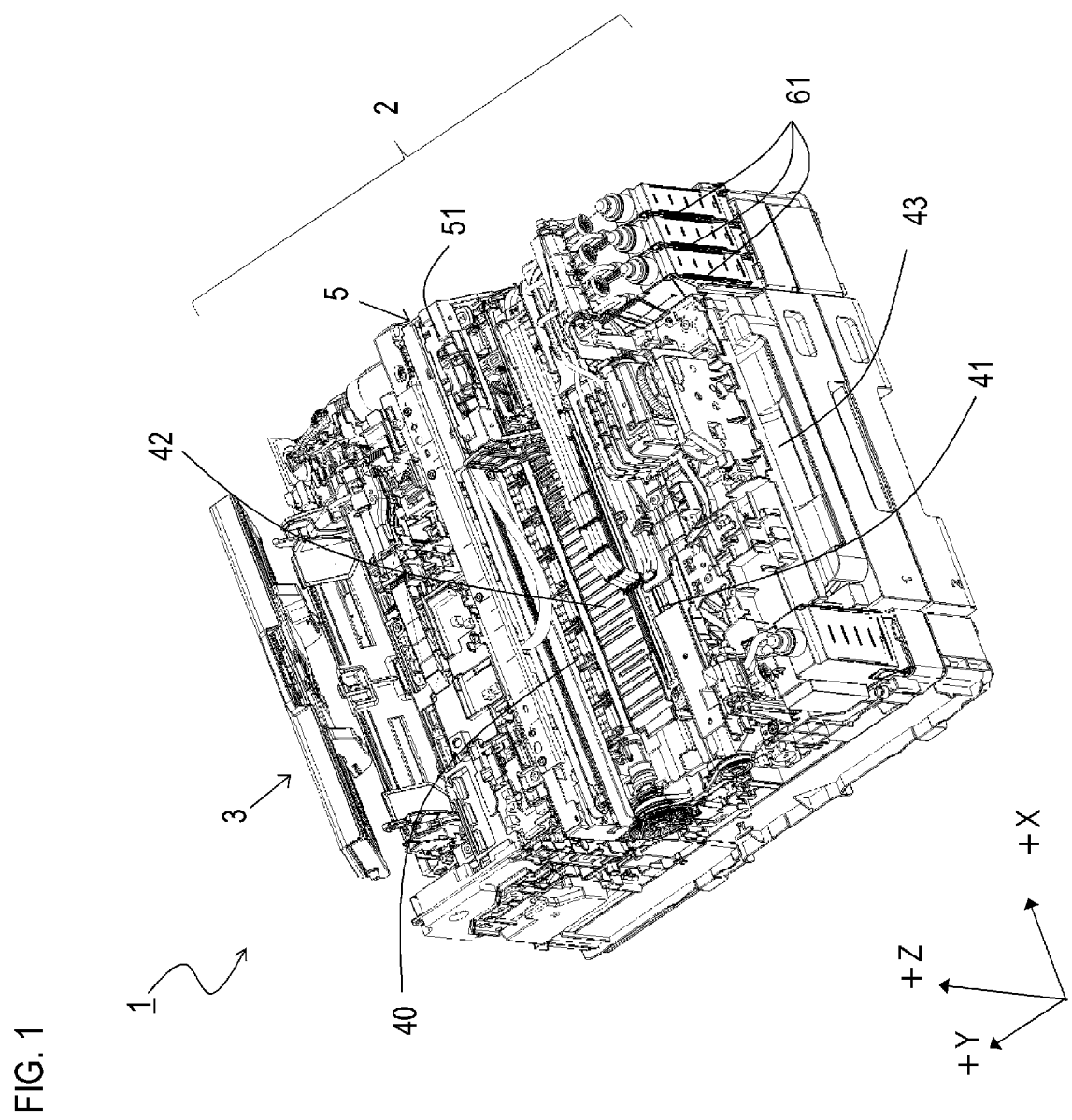
FIG. 1 is a perspective view showing a printer portion to which the present invention can be applied.

FIG. 1 is a perspective view for explaining the configuration of a recording apparatus 1 according to an embodiment of the present invention, and shows a configuration in the vicinity of a recording portion attached to (accommodated in) a lower case 2 in the configuration of the recording apparatus 1 in a state in which an outer cover is detached.

The recording apparatus 1 of the present embodiment is an example in which the present invention is applied to what is called an inkjet printer which performs recording of an image by discharging ink serving as liquid for image recording onto a recording material (liquid discharge method). The recording apparatus to which the present invention can be applied is not limited to an image recording apparatus (image forming apparatus) based on the liquid discharge method, and the present invention may also be applied to, e.g., the case configuration of an electrophotographic image recording apparatus (laser printer). Note that "recording" includes not only the case where intentional information such as a character or a figure is formed but also the case where an image, a design, or a pattern is widely formed on a recording medium or the case where a medium is processed irrespective of whether or not the information or the like to be formed is intentional, and it does not matter whether the information or the like to be formed is made obvious such that human beings can perceive it visually. In addition, in the present embodiment, a sheet material (paper) is assumed to be used as a "recording medium" (recording material), but the "recording medium" may also be cloth or plastic film.

Arrows X, Y, and Z in FIG. 1 denote a width direction, a depth direction, and a height direction of the recording apparatus 1, and the directions cross each other (herein, orthogonal to each other). The same applies to arrows X, Y, and Z in other drawings. These directions are determined with respect to an installation surface of the recording apparatus 1. For example, in the case where the recording apparatus 1 is installed on a horizontal plane as a normal installation state, it follows that the Z direction serving as the height direction corresponds to a vertical direction, and each of the X and Y directions corresponds to a horizontal direction.

As shown in FIG. 1, various mechanical portions of the recording apparatus 1 are mounted in the lower case 2 of an apparatus main body. On a far side of the lower case 2 in a +Y direction, a paper feed tray 3 on which the sheet material is placed is provided. With regard to the sheet material on the paper feed tray 3, an uppermost sheet is separated and fed to transport means 40 by feed means and a transport path (not shown). The sheet material fed to the transport means 40 is transported in a −Y direction (to a near side from a far side of the apparatus) through an image recording portion (image forming portion) 5 by the transport means 40 and paper discharge means 41 which is driven in synchronization with the transport means 40.

The image recording portion 5 between the transport means 40 and the paper discharge means 41 includes a carriage 51 which has a recording head (not shown) and reciprocates along the sheet material. The recording head receives supply of ink from an ink tank 61 in which ink required when printing is performed is stored, and also performs image recording by discharging the ink onto the sheet material based on recording information. At a position facing the image recording portion 5 in a gravity direction, a platen 42 for guiding and supporting the sheet material during image recording is disposed. The sheet material subjected to the recording is discharged onto a paper discharge tray 43 provided outside the apparatus main body through the paper discharge means 41.

Figure 2:
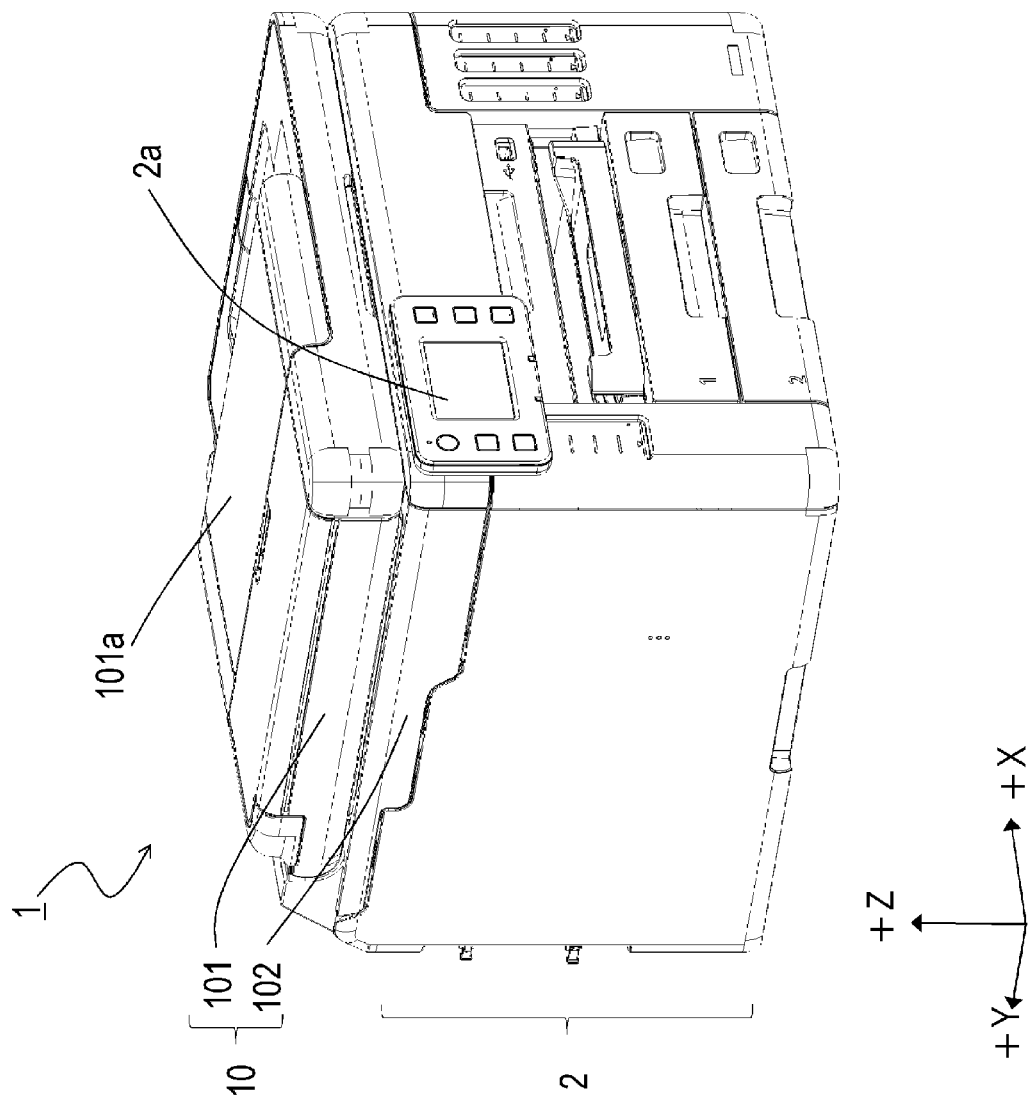
FIG. 2 is a perspective view of an image forming apparatus to which the present invention can be applied.

FIG. 2 is a schematic perspective view showing the outer configuration of the recording apparatus 1 according to the present embodiment, and shows a state in which a reading unit (reading apparatus) 10 serving as a reading portion is closed with respect to the lower case 2. The reading unit 10 is configured to engage the lower case 2 via a rotation shaft which is not shown and be able to be brought into a close state and an open state by rotating about the rotation shaft with respect to the lower case 2.

In the recording apparatus 1, an operation portion 2a for operating the recording apparatus 1 is provided. An operator can perform reading of a document with the reading unit (reading apparatus) 10, and perform a printing operation on recording paper with the image recording portion 5 by operating the operation portion 2a. Above the lower case 2, an automatic document feeder (ADF) 101 serving as a document transport apparatus (document transport portion) having a transport mechanism for reading a moving document is provided. At a position above the lower case 2 and below the ADF 101, a flatbed 102 serving as a scanner portion is provided. In the ADF 101, a document tray 101a on which a plurality of documents to be transported to the ADF 101 are placed is provided so as to be openable and closable with respect to the ADF 101 about a spindle which is not shown.

Figure 3:
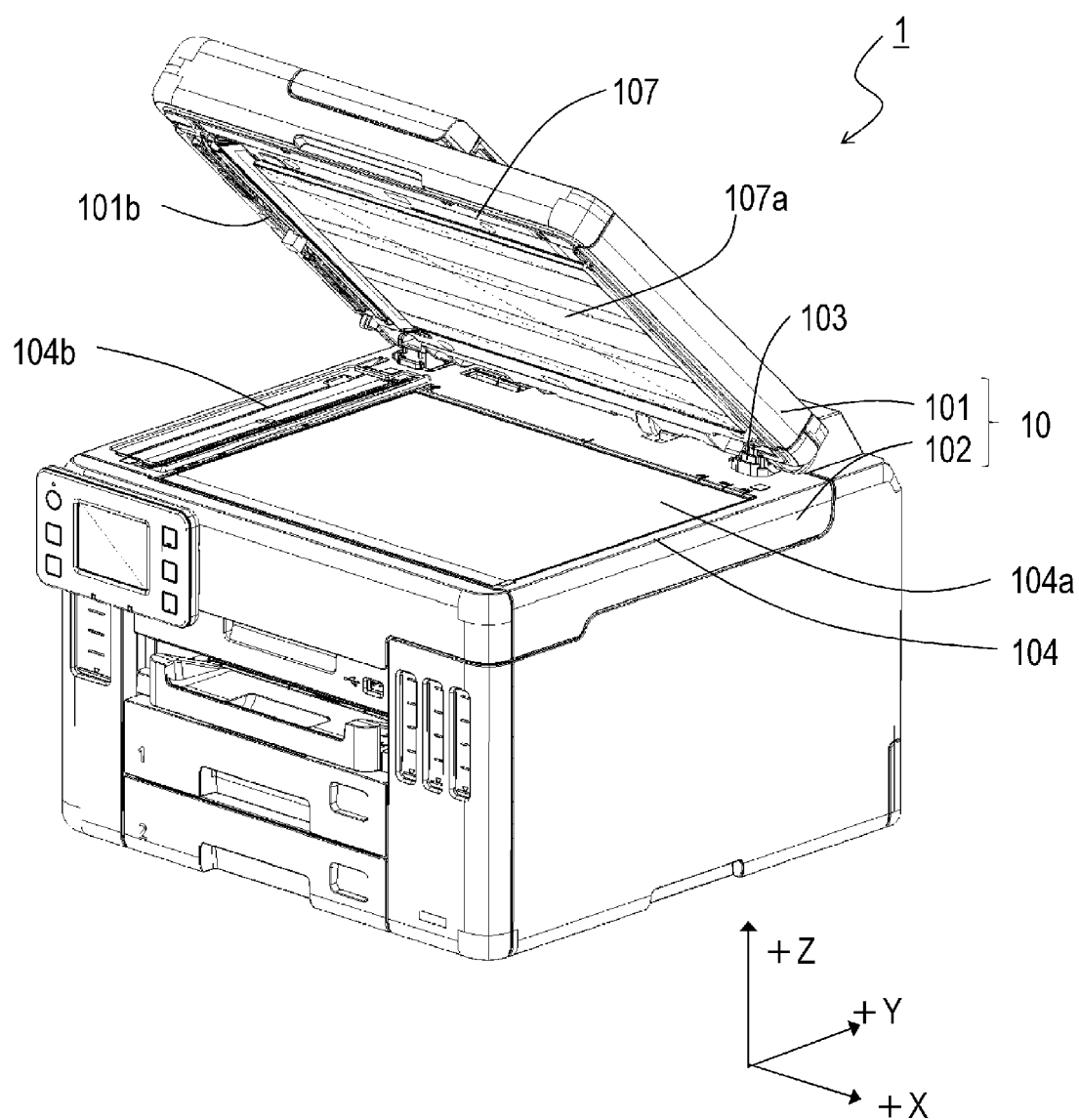
FIG. 3 is a perspective view in a state in which an ADF is opened.
Figure 4:
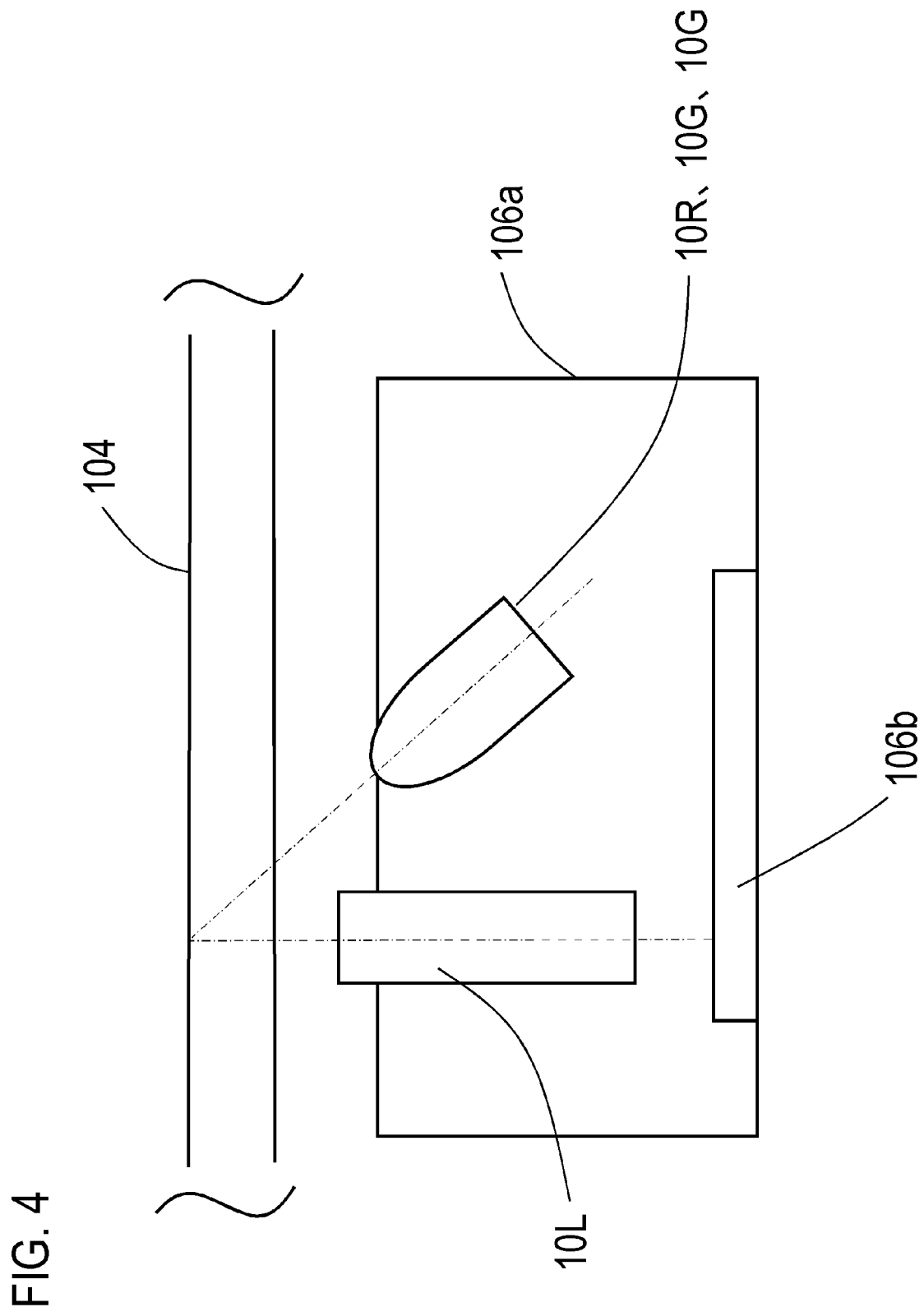
FIG. 4 is a cross-sectional view of a reading sensor.

FIG. 3 is a schematic perspective view showing the outer configuration of the recording apparatus 1 according to the present embodiment and is a perspective view in a state in which the ADF 101 is opened, and FIG. 4 is a cross-sectional view showing an image reading sensor. As shown in FIG. 3, on a printer portion which performs image printing, the reading unit 10 including the flatbed 102 serving as a flatbed image reading unit (scanner portion) and the ADF 101 serving as the document transport portion is disposed. That is, the apparatus main body having both of the document reading apparatus and recording apparatus is configured. Note that the present invention can also be applied to the image reading apparatus which does not include the document transport portion and has only the scanner portion. The ADF 101 is provided so as to be rotatable with respect to the flatbed 102 via a hinge 103. When document scanning which uses the flatbed 102 is performed, the ADF 101 is opened and access to the flatbed 102 is allowed, and placement of the document on the flatbed 102 and removal of the document from the flatbed 102 are allowed.

On a most area (a central portion and a right side in the X direction) of a case upper surface of the flatbed 102 except the left side of the case upper surface thereof in the X direction, a document stand glass 104a formed of a transparent glass plate is provided as a document stand for placing the document. In addition, on the left side of the case upper surface in the X direction, an ADF glass 104b formed of transparent plate glass forming part of a transport path 101b through which the transported document passes is provided. Inside the case, a sensor unit 106 which faces the document via the document stand glass 104a or the ADF glass 104b is disposed. The sensor unit 106 is incorporated into the case so as to perform scanning movement in the X direction in parallel with the document stand glass 104a, and includes an image reading sensor 106a.

FIG. 4 is a schematic cross-sectional view showing the configuration of the image reading sensor. As shown in FIG. 4, the image reading sensor 106a has LEDs 10R, 10G, and 10B for three colors which serve as document irradiation light sources, an image sensor 106 (a CCD sensor, a CMOS sensor, or the like), and a rod lens array 10L. The rod lens array 10L forms reflected light from the document into an image on a light receiving element of the image sensor 106. The image reading sensor 106a can perform color separation reading by sequentially turning on the LEDs 10R, 10G, and 10B for three colors which are red, green, and blue while switching among the LEDs 10R, 10G, and 10B and causing the image sensor 106 to read light which has been reflected by the document and has passed through the rod lens array 10L for each color. With this, it is possible to read the document in color.

As shown in FIG. 3, a document cover 107 serving as a document pressing member for pressing the document against the document stand glass 104a is attached onto the flatbed 102 so as to be openable and closable. A document pressing sheet 107a formed of a sheet material and a sponge is stuck to a right inner surface of the document cover 107 in the X direction at a position facing the document stand glass 104a. In addition, on a left inner surface of the document cover in the X direction, the transport path 101b through which the document transported by the document transport portion passes is provided so as to expose part of the transport path 101b at a position facing the ADF glass 104b.

Figure 5:
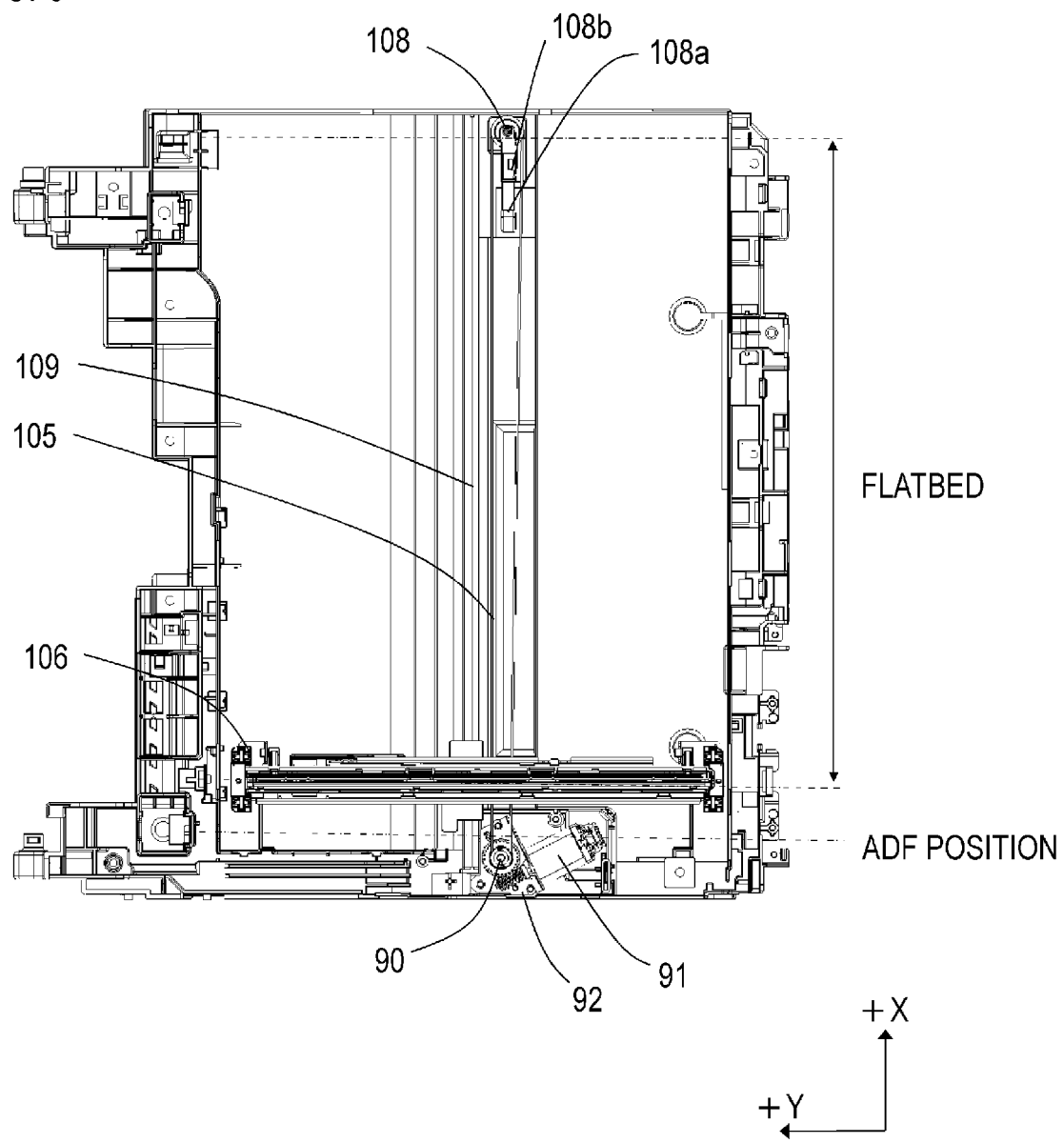
FIG. 5 is a detailed view for explaining a scanner portion.

With reference to FIG. 5, the configuration of the flatbed 102 will be described in detail. FIG. 5 is a plan view when viewed from above in which the document cover 107, the document stand glass 104a, and a document stand holding member 104 (see FIG. 3) for holding the document stand glass 104a are removed such that an internal portion of the flatbed 102 can be seen easily.

In the flatbed 102, the sensor unit 106 is disposed below the document stand glass 104a on which the document is placed, and the sensor unit 106 performs scanning movement between one end portion of the document in a width direction (X direction) and the other end portion thereof. Simultaneously with the scanning movement, light emission from the LEDs 10R, 10G, and 10B shown in FIG. 4 and light reception by the image sensor 106b are performed, and the document is thereby read. The sensor unit 106 is connected to a control board via a flat cable which is not shown, and a read signal of a document surface is transmitted to the control board. A movement mechanism (drive portion) for the scanning movement of the sensor unit 106 will be described below.

In the present embodiment, the sensor unit 106 is attached to part of a belt 105 and, with circulation motion of the belt 105, the sensor unit 106 reciprocates along a guide rail 109 at a position facing the document via the document stand glass 104a. The belt 105 is wound around a driving pulley 90 disposed on the left side of the apparatus and a driven pulley 108 disposed on the right side thereof in the X direction. The guide rail 109 extends in the X direction (moving direction, apparatus width direction) in the case of the flatbed 102.

As shown in FIG. 5, a spring 108a for giving specific tension to the belt 105 is attached to the driven pulley 108 via a pulley holder 108b. With the spring 108a, it is possible to cause the belt 105 to perform the circulation motion smoothly, and cause the sensor unit 106 to perform the scanning movement accurately. When flatbed scanning is performed, the sensor unit 106 reads a document surface while scanning an area which faces the document placed on the document stand glass 104*a* (in the drawing, an area between two one-dot chain lines). When ADF scanning is performed, the sensor unit 106 moves to an ADF position (a position indicated by a two-dot chain line in the drawing) in order to read the transported document surface, and performs a reading operation.

As shown in FIG. 5, a motor 91 serving as a drive source of the belt 105 is transversally fixed to a motor holder 92 such that a shaft (motor shaft) extends in a direction parallel to the document stand glass 104*a*. The driving pulley 90 is rotatably attached to the motor holder 92. The motor 91 is provided on the left in an apparatus X direction together with the driving pulley 90.

Figure 6:
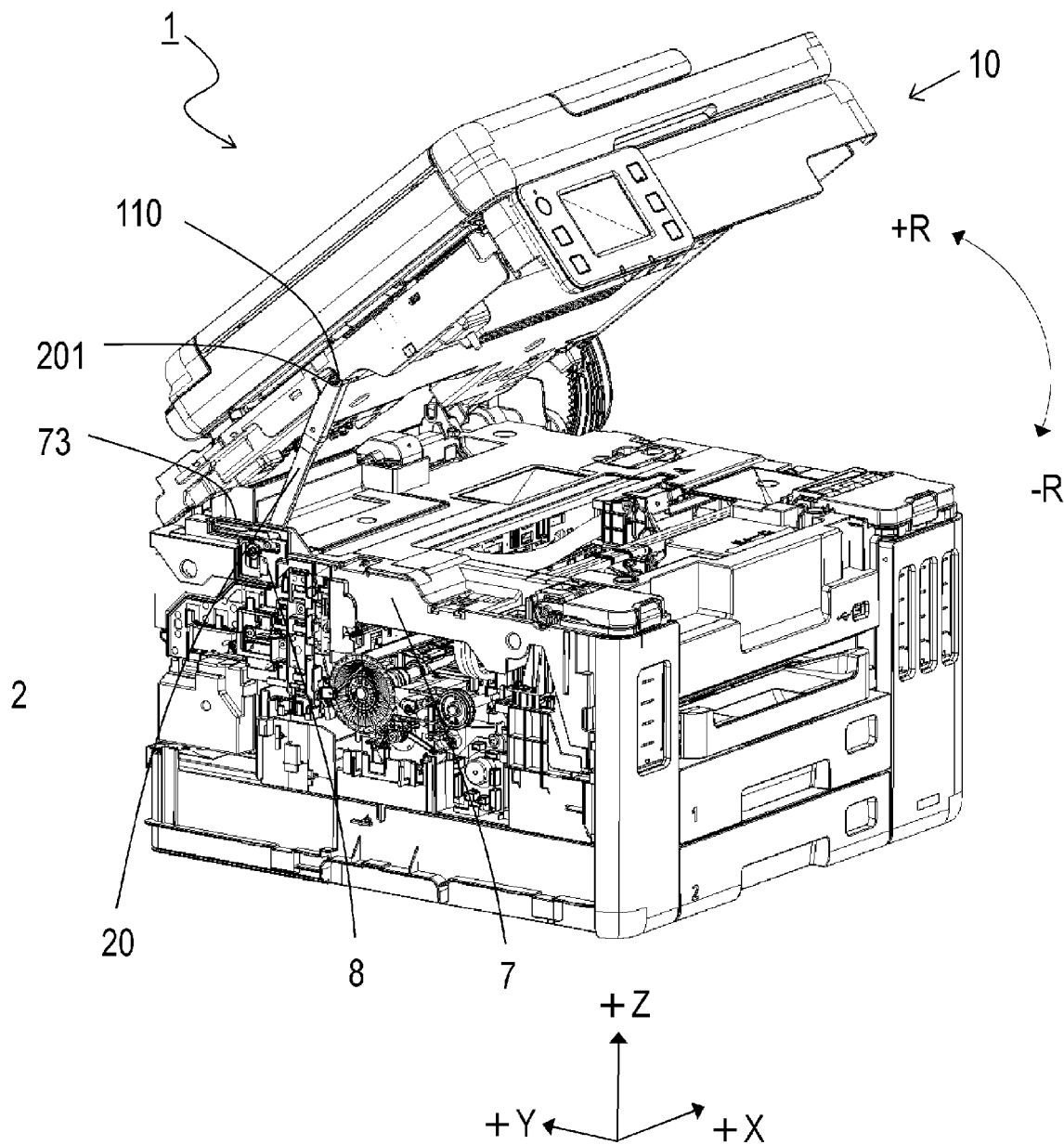
FIG. 6 is a perspective view of the image forming apparatus in a state in which an access portion is opened.

FIG. 6 shows a state in which, when a user removes paper jammed around the image recording portion 5 or in the transport path or replaces the recording head, the reading unit 10 is opened in a +R direction, and access to the internal portion of the lower case 2 is allowed. The reading unit 10 is configured to be rotatable about a rotation axis extending in the moving direction (X direction) on an apparatus far side (Y direction+side) with respect to the lower case 2, and rotates such that an apparatus near side (Y direction−side) is lifted upward with respect to the apparatus far side. That is, the reading unit 10 is configured to be able to be brought into the close state in which the height of the apparatus near side of the reading unit 10 is substantially equal to the height of the apparatus far side thereof, and the open state in which the apparatus near side thereof is positioned above the apparatus far side thereof, and the upper portion of the lower case 2 is opened to the outside.

Figure 12C:
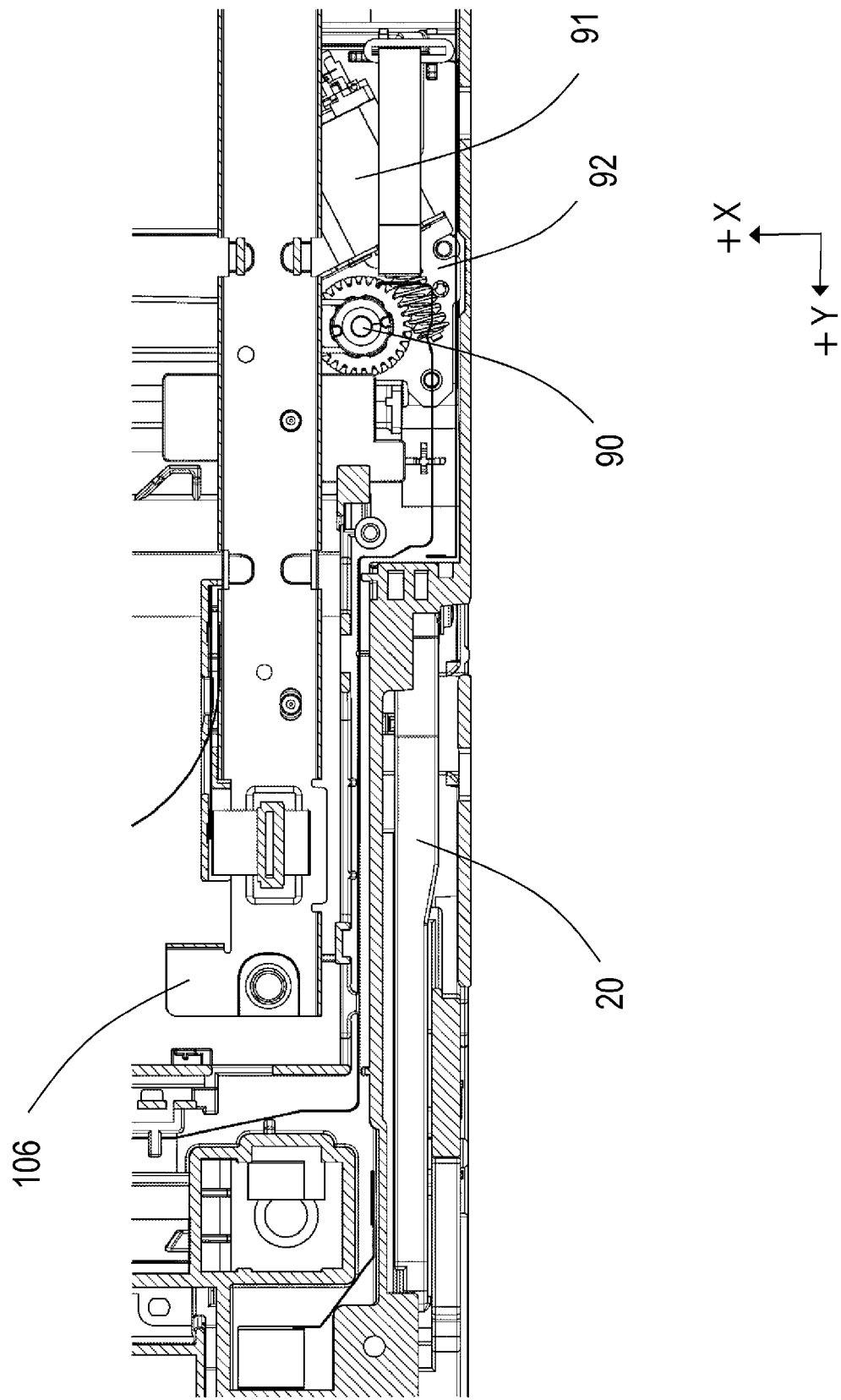
FIG. 12C is a cross-sectional view of the scanner portion and the stay member.
Figure 12D:
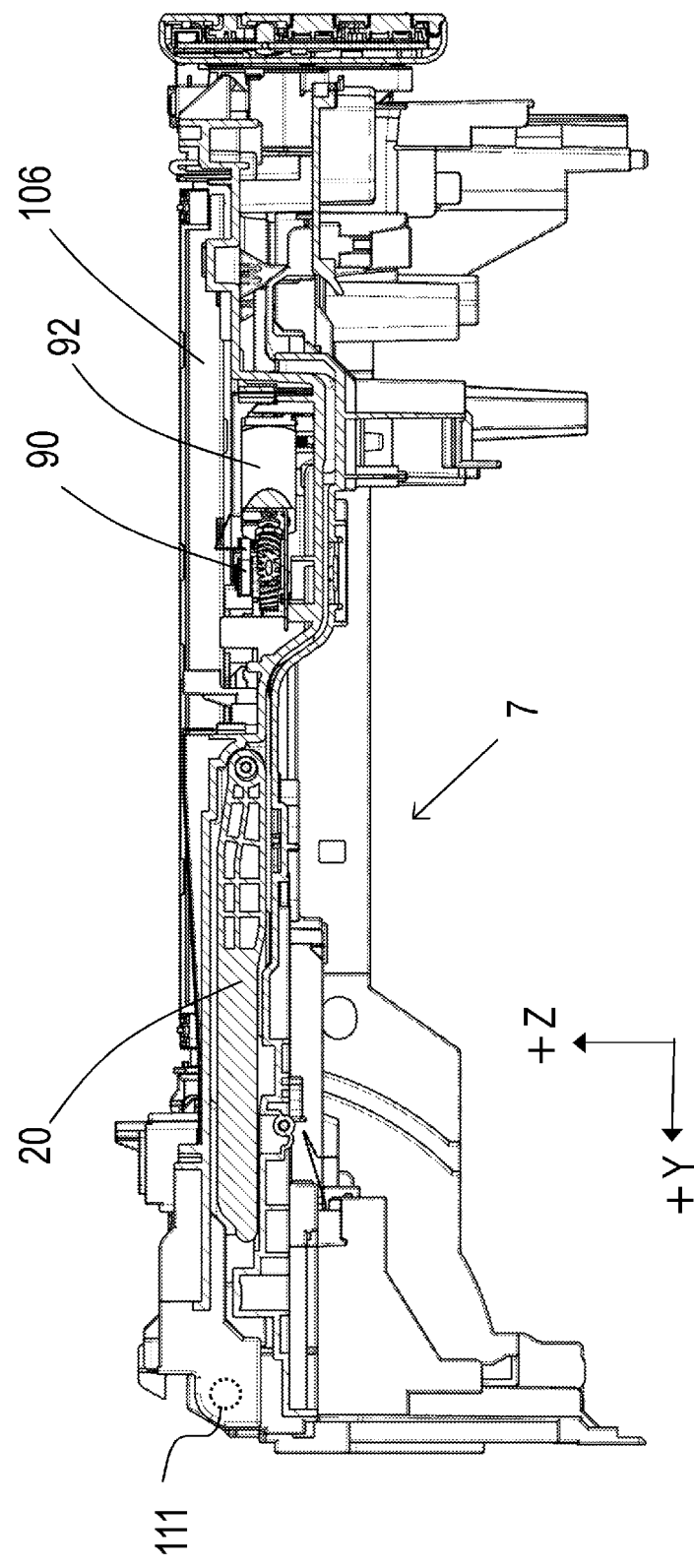
FIG. 12D is a cross-sectional view of the scanner portion and the stay member.
Figure 12E:
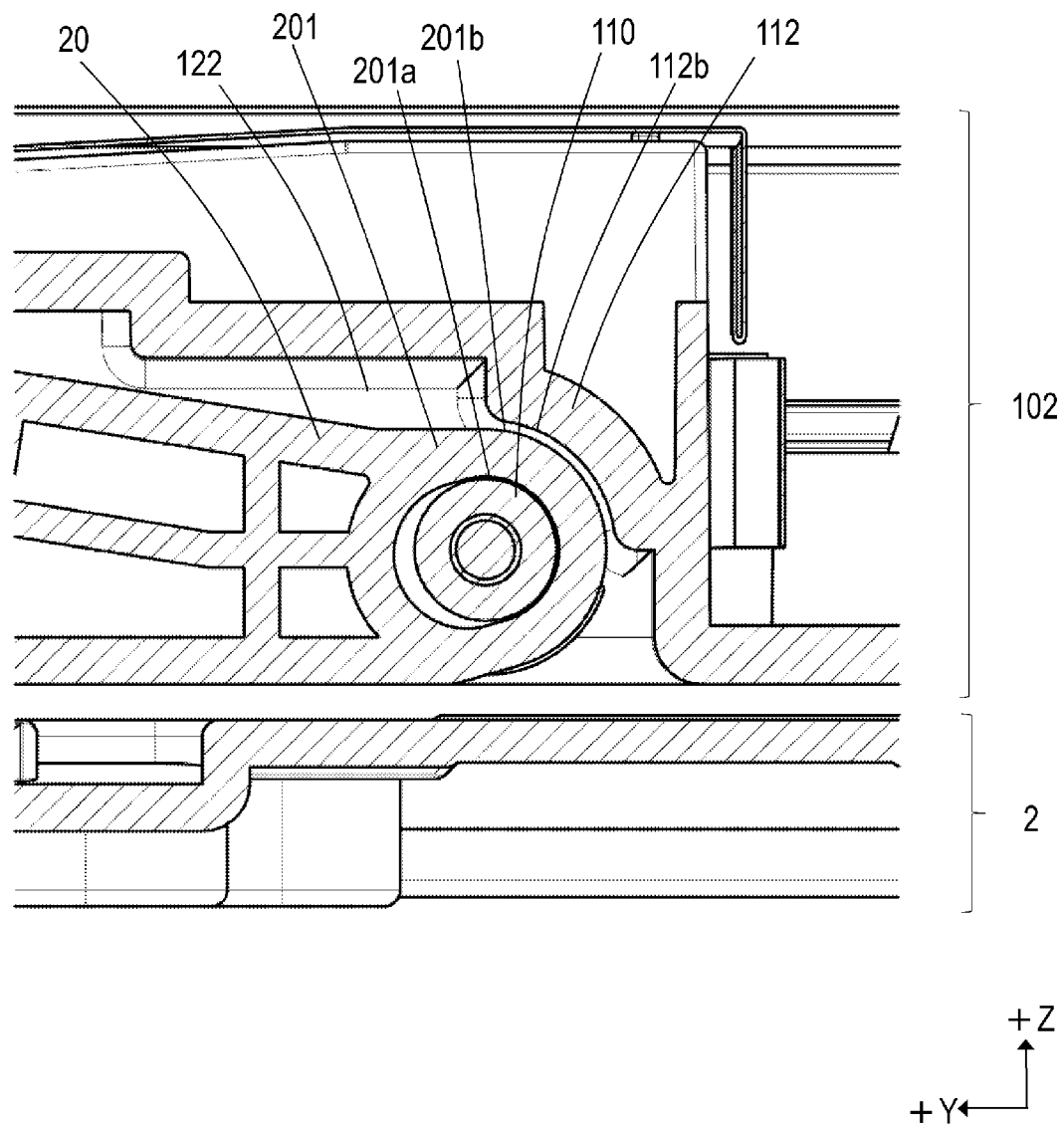
FIG. 12E is a cross-sectional view of the scanner portion and the stay member.
Figure 12F:
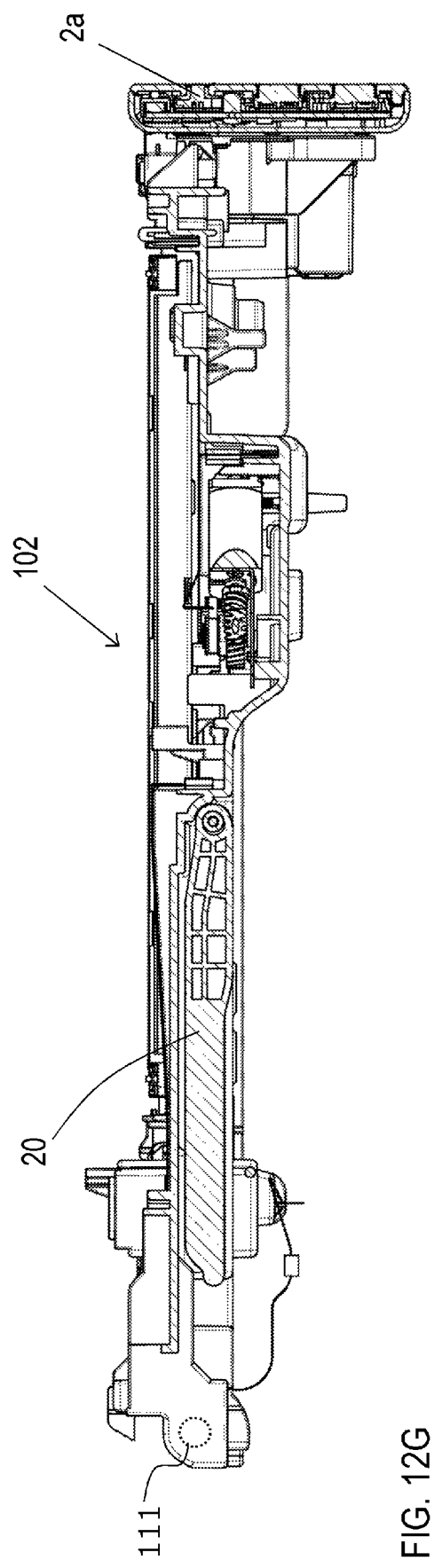
FIGS. 12F and 12G are cross-sectional views each showing the scanner portion and the stay member.

More specifically, the reading unit 10 includes a rotation shaft 111 which is provided along the moving direction on the apparatus far side, and the rotation shaft 111 is connected to a frame member 7 forming a bearing portion 75 of the lower case 2 in a state in which the rotation shaft 111 is substantially fitted into the frame member 7 (see FIG. 12F). The bearing portion 75 is formed into the shape of an elongated hole which is elongated in an apparatus front-rear direction (Y direction) such that slight play is provided between the bearing portion 75 and the rotation shaft 111 of the reading unit 10. The reading unit 10 can rotate about the rotation shaft 111 fitted into the bearing portion 75 with respect to the lower case 2. Besides the rotation shaft 111, a stay shaft 110 is provided in the lower portion of the reading unit 10. The stay shaft 110 is substantially fitted into a stay bearing 201 of a stay 20 in a first direction of a pivotal support radial direction, and the stay shaft 110 is connected to the reading unit 10 with a gap such that the stay shaft 110 is not fitted into the stay bearing 201 in a second direction of the pivotal support radial direction perpendicular to the first direction. In addition, the stay 20 is configured such that, with respect to one end side of the stay 20 at which the stay bearing 201 is provided, the other end side thereof engages a rail portion 73 provided in the frame member 7 described later and is guided by the rail portion 73. That is, the stay 20 is configured such that one end thereof is rotatably coupled to the reading unit 10, and the other end thereof is rotatably coupled to the frame member 7 of the lower case 2 so as to be able to slide the position of a rotation shaft in a direction orthogonal to the rotation shaft. The reading unit 10 is configured to be able to be brought into the open state with respect to the lower case 2 by causing the stay 20 to take a predetermined support posture between the reading unit 10 and the frame member 7. Note that, in each of a combination of the rotation shaft 111 and the bearing portion 75 and a combination of the stay shaft 110 and the stay bearing 201, the shaft portion and the bearing portion may be configured such that the positions thereof are interchanged.

Figure 7:
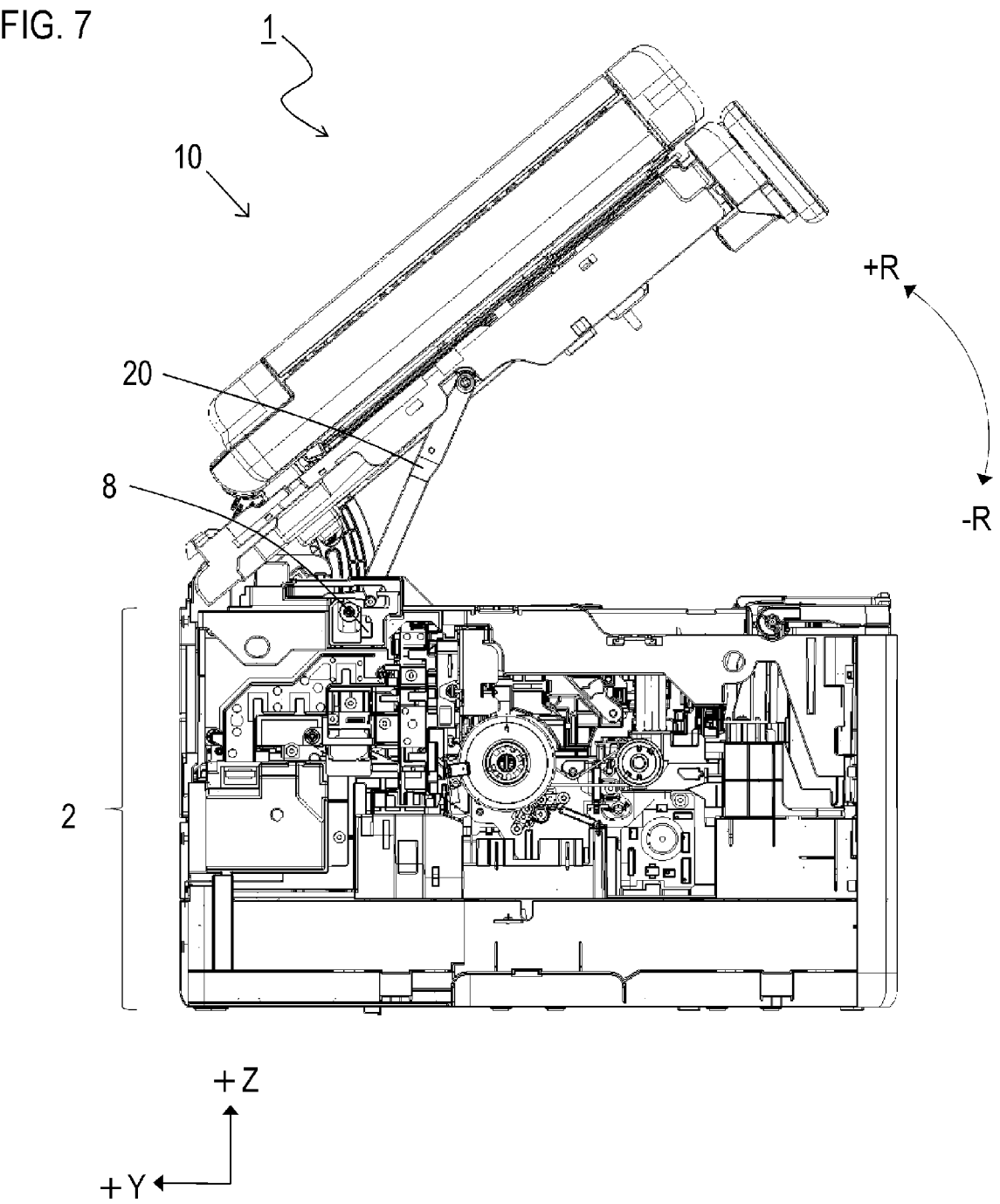
FIG. 7 is a side view of the image forming apparatus in the state in which the access portion is opened.
Figure 8A:
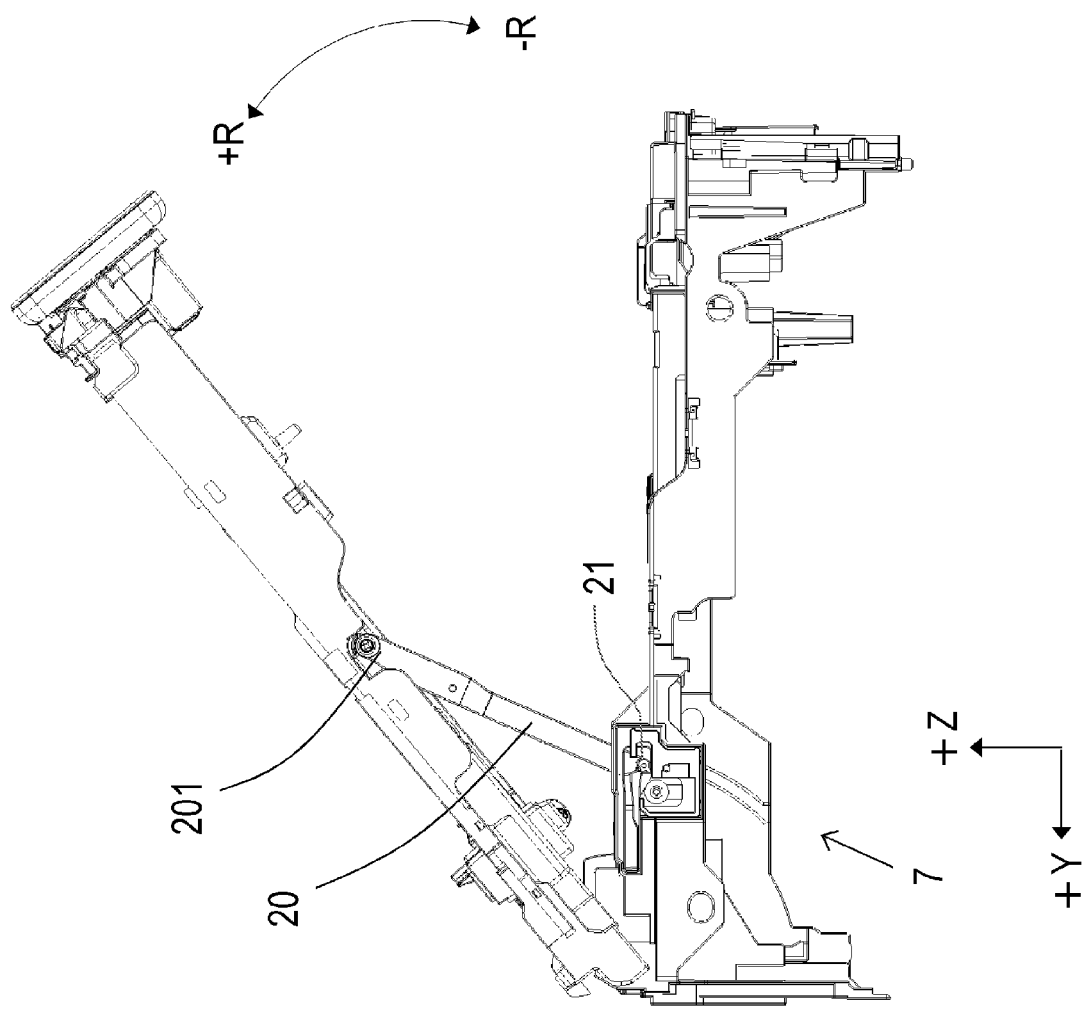
FIG. 8A is a side view showing the position of a stay member in the state in which the access portion is opened.
Figure 8B:
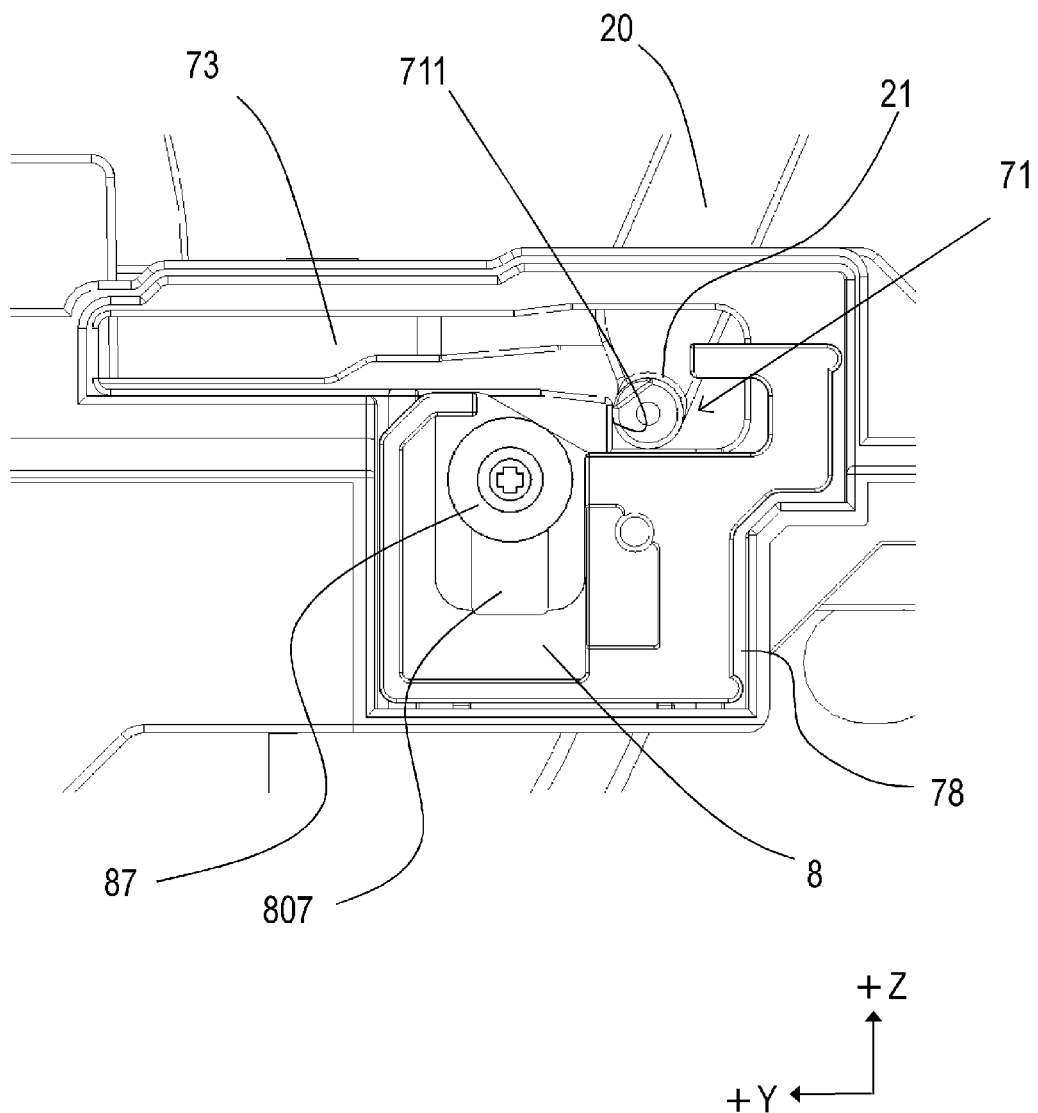
FIG. 8B is a side view showing the position of the stay member in the state in which the access portion is opened.

Each of FIG. 7, FIG. 8A, and FIG. 8B is a left side view showing a situation when an opening member 8 described later is at a first position, and the reading unit 10 is maintained in an opened state. Each of FIGS. 8A and 8B is a view for showing that the stay 20 is supported by the frame member 7 and the reading unit 10 thereby maintains the opened state. As shown in FIGS. 8A and 8B, the stay 20 is a pillar-shaped long member which supports the reading unit 10 in the opened state with respect to the lower case 2, has the stay bearing 201 on one end side, and has a holding portion 21 which engages the rail portion 73 of the frame member 7 on the other end side. The holding portion 21 is a boss-shaped portion which protrudes outward in the X direction (−X direction) on the other end side of the stay 20 and, its outer peripheral surface engages a holding contact portion 71 provided on a −Y direction side of the rail portion 73 and the opened state of the reading unit 10 is thereby maintained. That is, the holding portion 21 of the stay 20 comes into contact with a holding contact surface 711 of the holding contact portion 71 formed at a position facing the holding portion 21 with respect to the rotation direction of the stay 20 by the weight of the reading unit 10. With this, the other end side of the stay 20 is fixed to the frame member 7, and the reading unit 10 is maintained in the opened state.

Figure 8C:
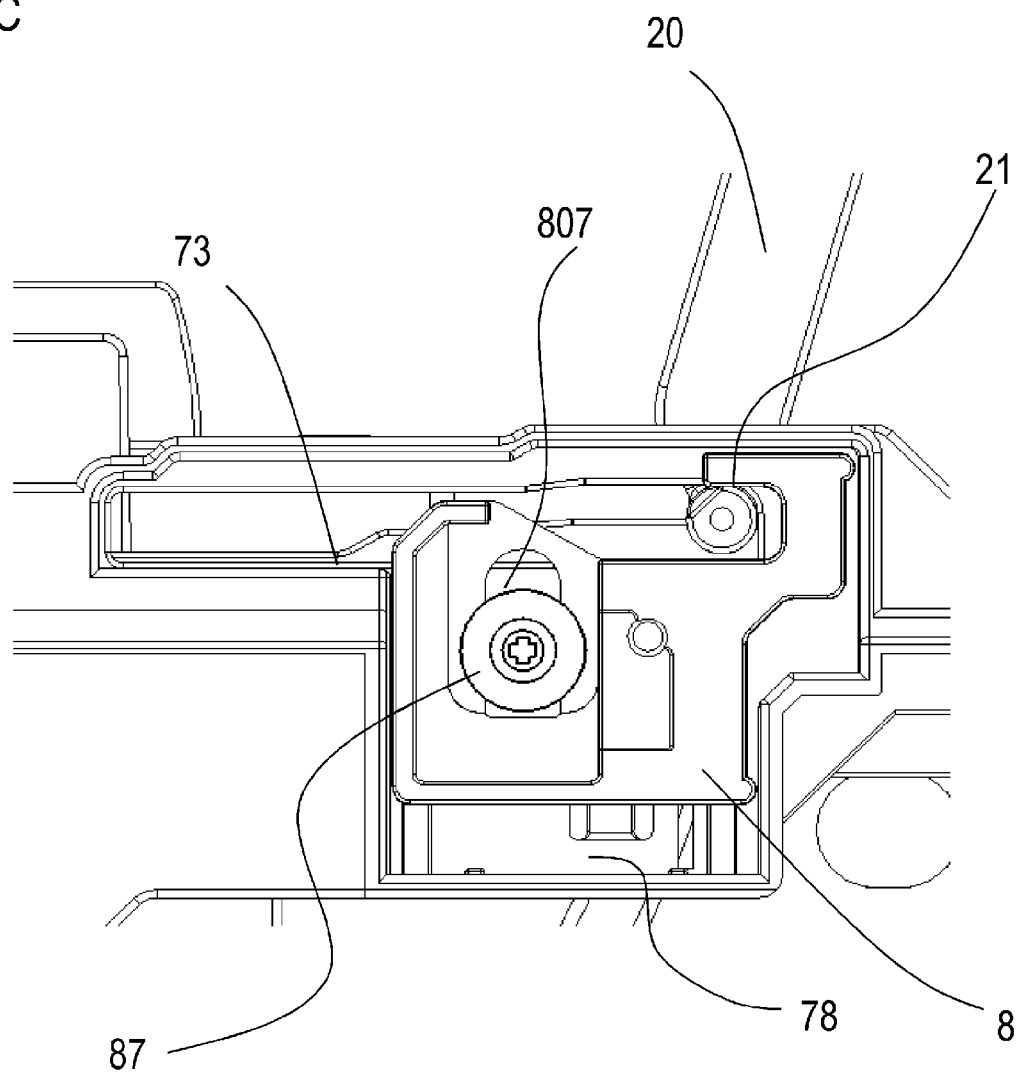
FIG. 8C is a side view showing the position of the stay member in the state in which the access portion is opened.

FIG. 8C is a left side view showing a situation when the opening member 8 is at a second position, and is a view showing a state in which the reading unit 10 is able to shift from the opened state (open state) to a closed state (close state). That is, the stay 20 is movable with respect to the frame member 7 such that the holding portion 21 of the stay bearing 201 is guided by the rail portion 73 with respect to the frame member 7. Details of opening and closing operations of the reading unit 10, change of the position of the opening member 8, and the movement of the stay 20 with respect to the frame member 7 will be described later.

Figure 9A:
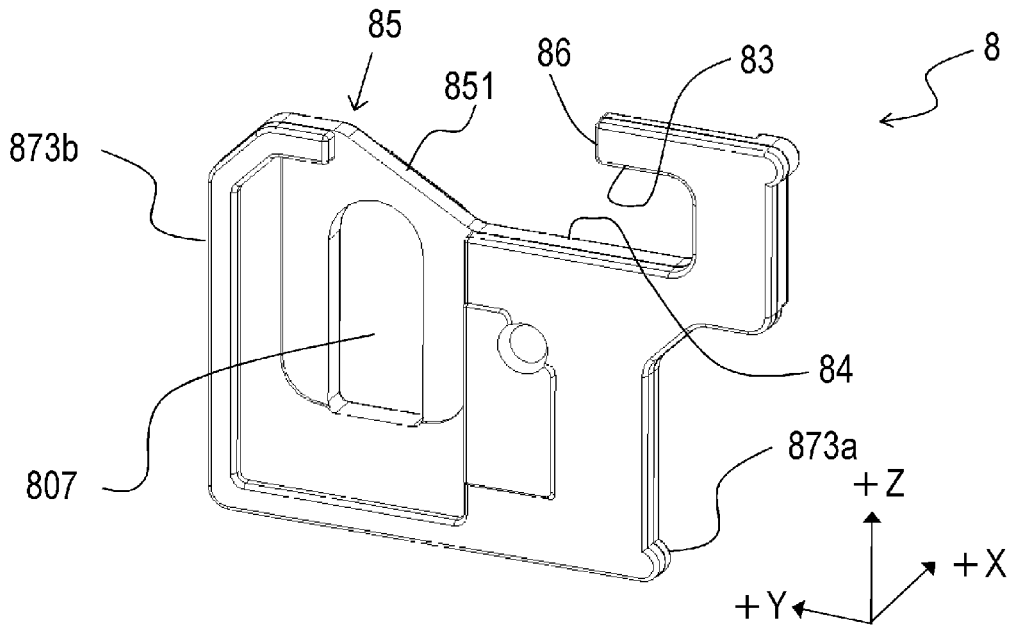
FIGS. 9A and 9B are perspective views of an opening member.
Figure 9B:
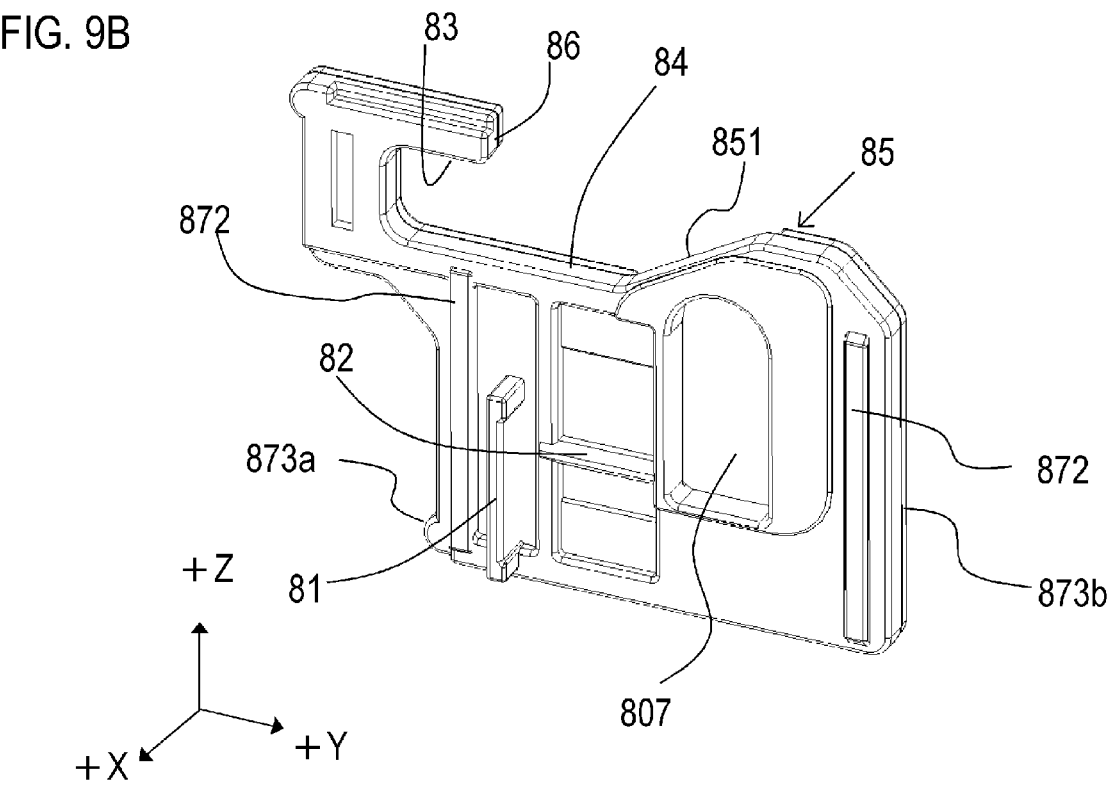
Figure 9C:
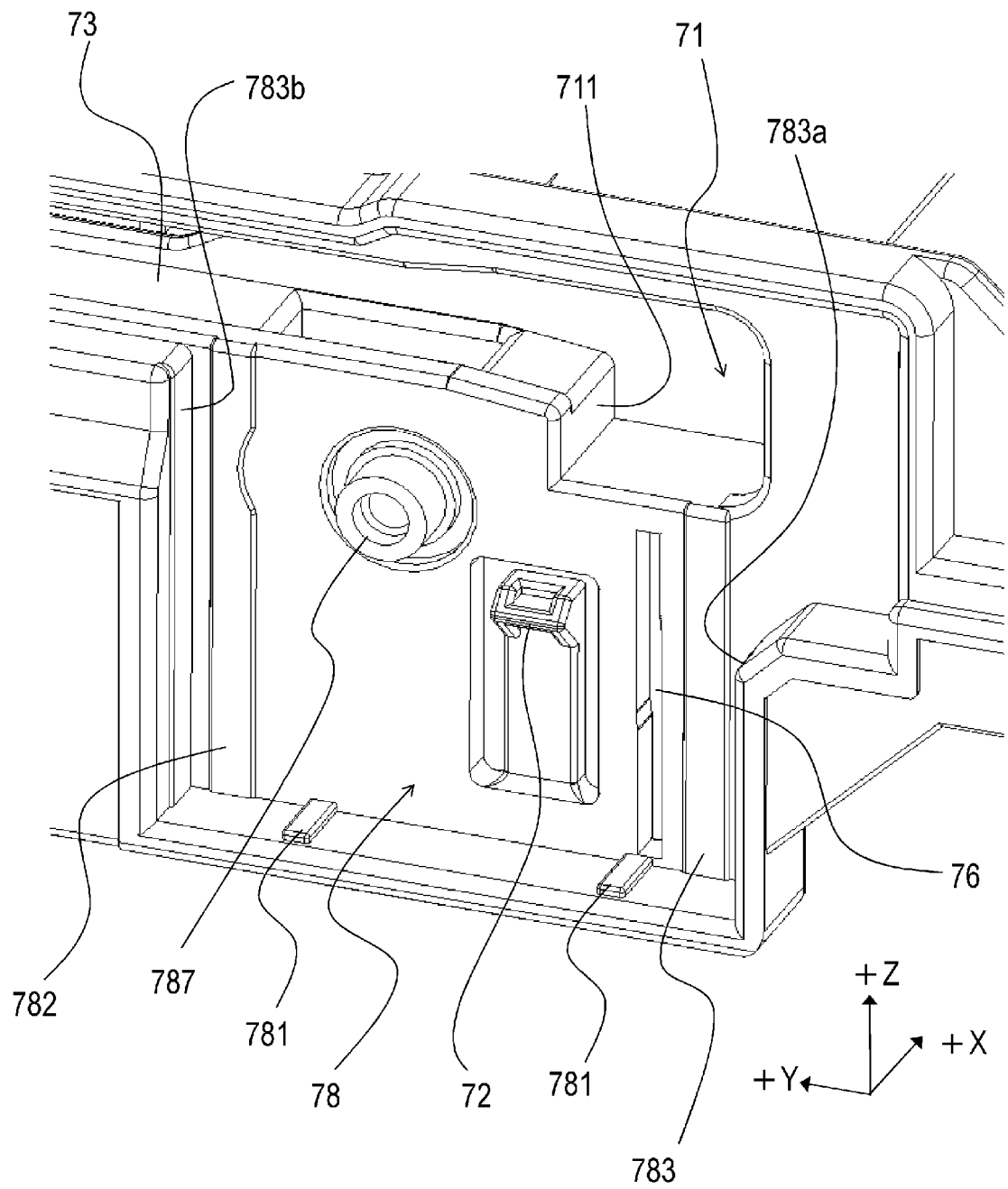
FIG. 9C is a perspective view of the opening member.
Figure 10B:
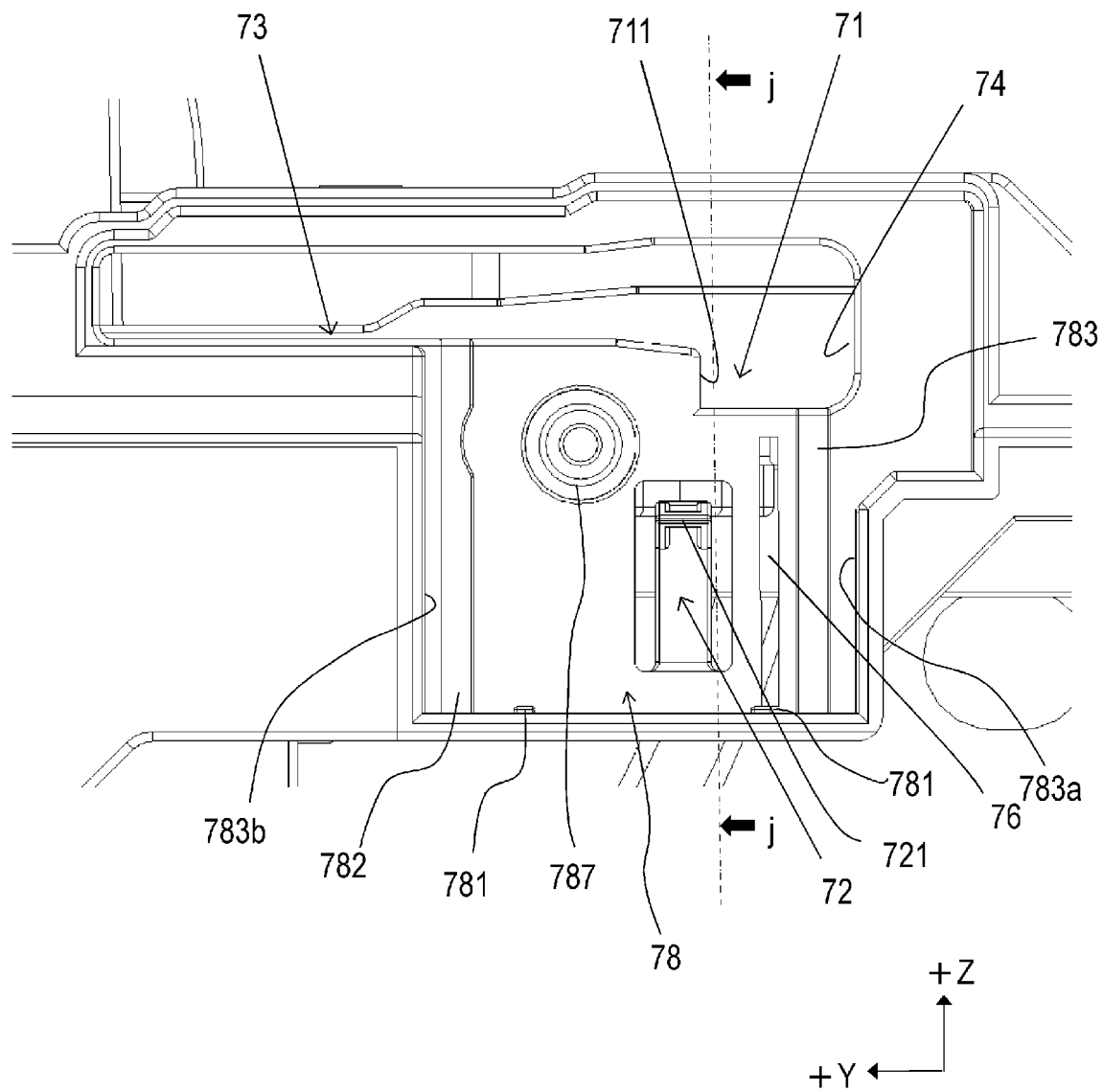
FIG. 10B is a side view of the frame member.
Figure 10C:
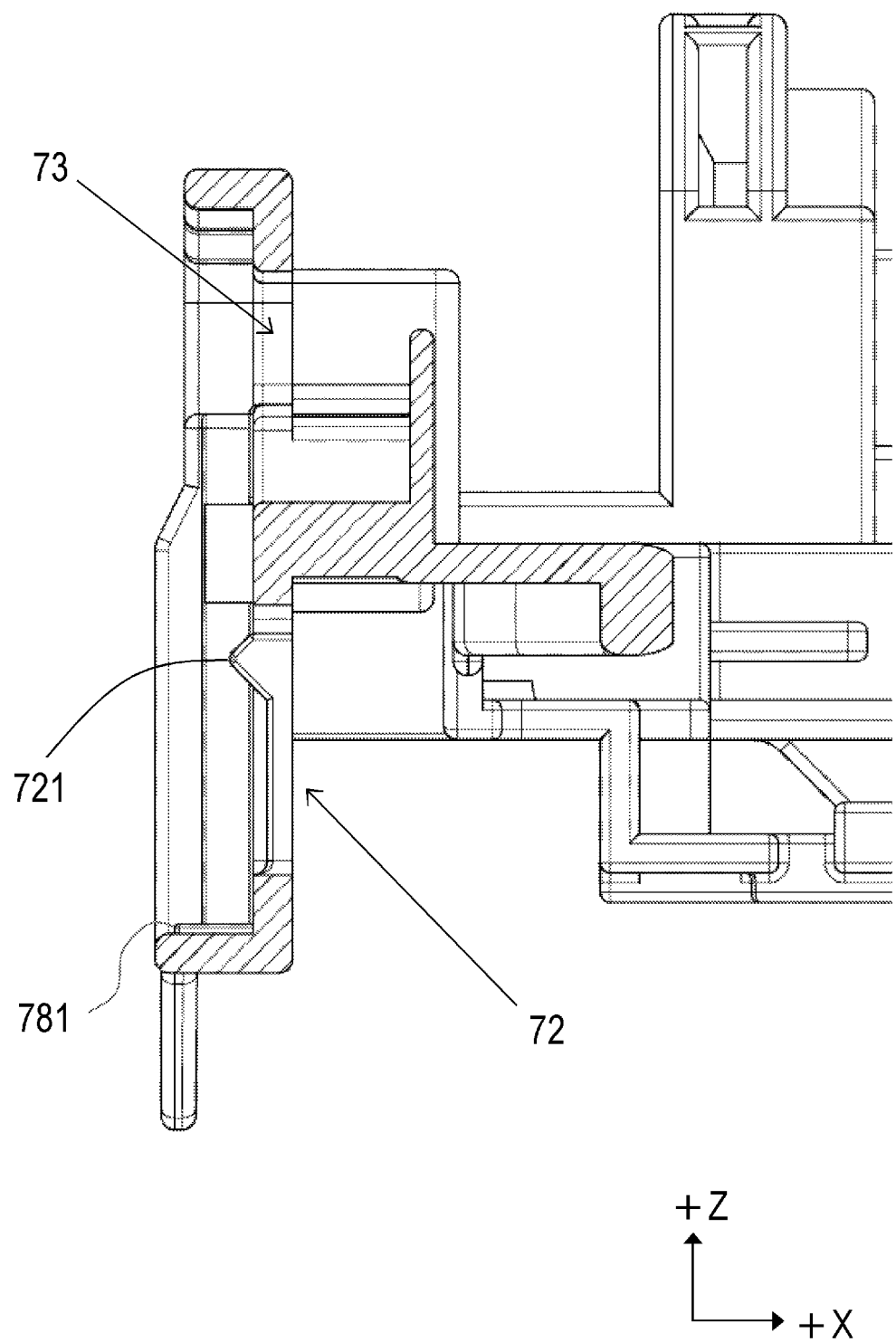
FIG. 10C is a cross-sectional view of the frame member.

Each of FIGS. 9A and 9B is a perspective view of the opening member 8, FIG. 9A shows a situation of a side opposite to a side of the opening member 8 which is mounted to the frame member 7, and FIG. 9B shows a situation of the side of the opening member 8 which is mounted to the frame member 7. FIG. 9C is a perspective view showing an area around a portion of the frame member 7 to which the opening member 8 is mounted. Each of FIGS. 10A and 10B is a side view of the frame member 7, and FIG. 10C is a cross-sectional view of the frame member 7. Each of FIGS. 11A to 11H is a cross-sectional view showing two positions which the opening member 8 can take with respect to the frame member 7 by using the arrows j-j in FIGS. 10A and 10B.

As shown in FIGS. 9A and 9B, the opening member 8 has a guided hole 807 which extends through the opening member 8 in the X direction. The guided hole 807 is formed so as to extend in the Z direction. As shown in FIG. 9C, a mounting depressed portion 78 for the opening member 8 in the frame member 7 is formed into a concave shape which is depressed in a +X direction on a side surface of the frame member 7 on an X direction−side, and the plate-shaped opening member 8 is accommodated in the depressed portion so as to extend along the bottom surface of the depressed portion. As shown in FIG. 8B or the like, the opening member 8 is mounted so as to be prevented from being detached from the mounting depressed portion 78 by a flange-button bolt 87 inserted into the guided hole 807. A threaded shaft portion of the bolt 87 is screwed into a threaded hole of a shaft portion 787 (see FIG. 9C) of the frame member 7 inserted into the guided hole 807, and a flange portion thereof comes into contact with a surface around the guided hole 807 of the opening member 8 in the +X direction and pushes the opening member 8 against the mounting depressed portion 78 in the +X direction.

In addition, as shown in FIG. 9B, the opening member 8 has a position guiding portion 81 serving as a guided protrusion which is formed so as to protrude from a surface facing the mounting depressed portion 78 in the +X direction and extend in the Z direction. On the other hand, as shown in FIG. 9C, the mounting depressed portion 78 has a guide hole 76 into which the above position guiding portion 81 is inserted and fitted. The guide hole 76 has a predetermined guide shape so as to be able to form a predetermined fitting state between the guide hole 76 and the position guiding portion 81 (details thereof will be described later).

The opening member 8, in the positional change, slides in the Z direction relative to the frame member 7 by guiding mainly of the shaft portion 787 inserted into the guided hole 807 and the guide hole 76 into which the position guiding portion 81 is fitted. At this point, the bolt 87 moves relatively in the Z direction in the guided hole 807, and the position guiding portion 81 moves relatively in the Z direction in the guide hole 76.

As shown in FIG. 9C, in the mounting depressed portion 78 of the frame member 7, various contact portions (guide portions) 781, 782, and 783 capable of facing the opening member 8 in various directions and coming into contact with the opening member 8 are provided in order to control the posture of the opening member 8 in the mounting depressed portion 78.

A lower end support portion 781 is a contact portion which comes into contact with an end surface of the opening member 8 on a Z direction−side in the +Z direction, i.e., supports a lower end surface of the opening member 8 from below. In the present embodiment, the lower end support portions 781 are provided at two locations on one side and the other side in the Y direction, but the lower end support portions 781 may be provided at three or more locations, or the lower end support portion 781 may also be configured to support the entire lower end surface of the opening member 8 as a single support portion. However, so as not to obstruct smooth movement of the opening member 8 in the mounting depressed portion 78, it is preferable to limit the size of a support surface (contact surface) in order to permit change of the posture of the opening member 8 allowed by predetermined backlash between the opening member 8 and the mounting depressed portion 78 described later.

A facing surface guide portion 782 is a guiding protruded portion which is provided so as to be protruded in the −X direction in a facing surface (depressed portion bottom surface) which faces the opening member 8 in the −X direction in the mounting depressed portion 78, and is provided so as to extend in the Z direction. On the other hand, the opening member 8 has a guided protruded portion 872 which is provided so as to be protruded in the +X direction on a surface which faces the above facing surface of the mounting depressed portion 78, and is provided so as to extend in the Z direction. In a state in which the opening member 8 is mounted to the mounting depressed portion 78, the above facing surface guide portion 782 and the guided protruded portion 872 are in contact with each other in the X direction.

The opening member 8 is brought into a state in which the opening member 8 is held in the X direction between the flange portion of the above bolt 87 which comes into contact with the opening member 8 in the +X direction and the facing surface guide portion 782 which comes into contact with the opening member 8 in the −X direction, is mounted to the mounting depressed portion 78, and is held so as to be slidable in the Z direction.

Side surface guide portions 783a and 783b are guide portions which face, in the Y direction, end surfaces on a Y direction side of the opening member 8, and are a depressed portion side surface pair extending in the Z direction. On the other hand, the opening member 8 has a protruded guided portion 873a protruded in the −Y direction which faces, of the side surface guide portions 783a and 783b, the side surface guide portion 783a on the Y direction−side, and a guided portion 873b which faces the side surface guide portion 783b on the Y direction+side and extends in the Z direction. By making a contact area with the side surface guide portion 783a on one end side in the Y direction different from a contact area with the side surface guide portion 783b on the other end side in the Y direction, the posture change of the opening member 8 in the mounting depressed portion 78 is permitted within a predetermined range, and smooth movement of the opening member 8 in the mounting depressed portion 78 is not obstructed.

As shown in FIG. 9B, the opening member 8 has a rib-shaped biased portion 82 which protrudes from a surface facing the mounting depressed portion 78 in the +X direction, and extends in the Y direction. On the other hand, as shown in FIG. 9C, the mounting depressed portion 78 has a biasing portion 72 which engages the above biased portion 82 and causes a biasing force for causing the opening member 8 to be kept at the second position to act on the above biased portion 82 when the opening member 8 is at the second position shown in FIG. 8C or the like. Details of the biasing portion 72 will be described later.

The opening member 8 has a switching portion 83 for receiving a force for switching the position from the first position shown in FIG. 8B or the like to the second position shown in FIG. 8C or the like from the holding portion 21 of the stay 20. In addition, the opening member 8 has a rail connection portion 84 which guides the holding portion 21 in the +Y direction so as to rotate the stay 20 when the position is switched to the second position and the reading unit 10 is then rotated from the opened state to the closed state (−R direction). Further, the opening member 8 has a release portion 85 which receives a force from the holding portion 21 of the stay 20 in a direction in which biasing of the biasing portion 72 is released when the opening member 8 is at the second position. Furthermore, the opening member 8 has an abutment portion 86 on which the holding portion 21 abuts when the reading unit 10 is rotated from the close state in an opening direction and which guides the holding portion 21 such that the holding portion 21 is fitted in the holding contact portion 71. Details of these portions will be described later.

As shown in FIGS. 10A to 10C, the frame member 7 includes the holding contact portion 71 which maintains the posture of the stay 20 which maintains the reading unit 10 in the opened state by coming into contact with the stay 20, and the biasing portion 72 for holding the opening member 8 at the second position. In addition, the frame member 7 includes the rail portion 73 which controls the vertical position of the holding portion 21 of the stay 20 which rotates in synchronization with opening and closing of the reading unit 10 and guides the holding portion 21, and extends substantially horizontally, and a controlling portion 74 which controls the movement of the stay 20 in the −Y direction. As described above, the frame member 7 includes the bearing portion 75 which pivotally supports the reading unit 10, and the reading unit 10 is configured to be able to openably and closably rotate between the open state and the close state with respect to the lower case 2 about the rotation shaft 111 which is substantially fitted into the bearing portion 75.

Figure 11A:
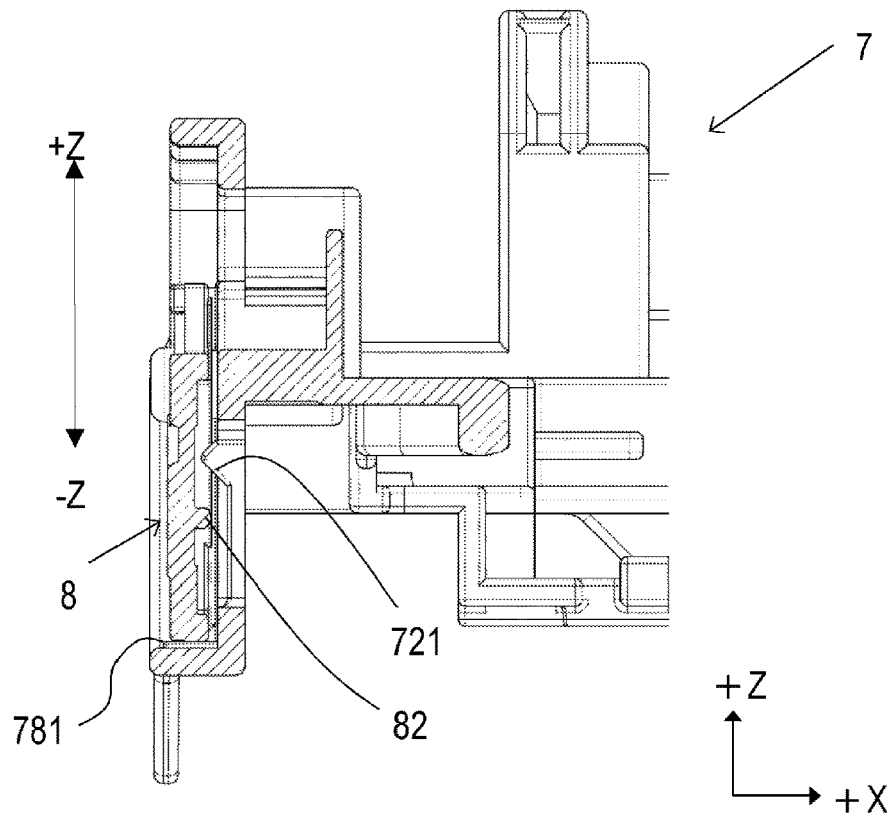
FIGS. 11A and 11B are cross-sectional views each showing the position of the opening member with respect to the frame member.
Figure 11B:
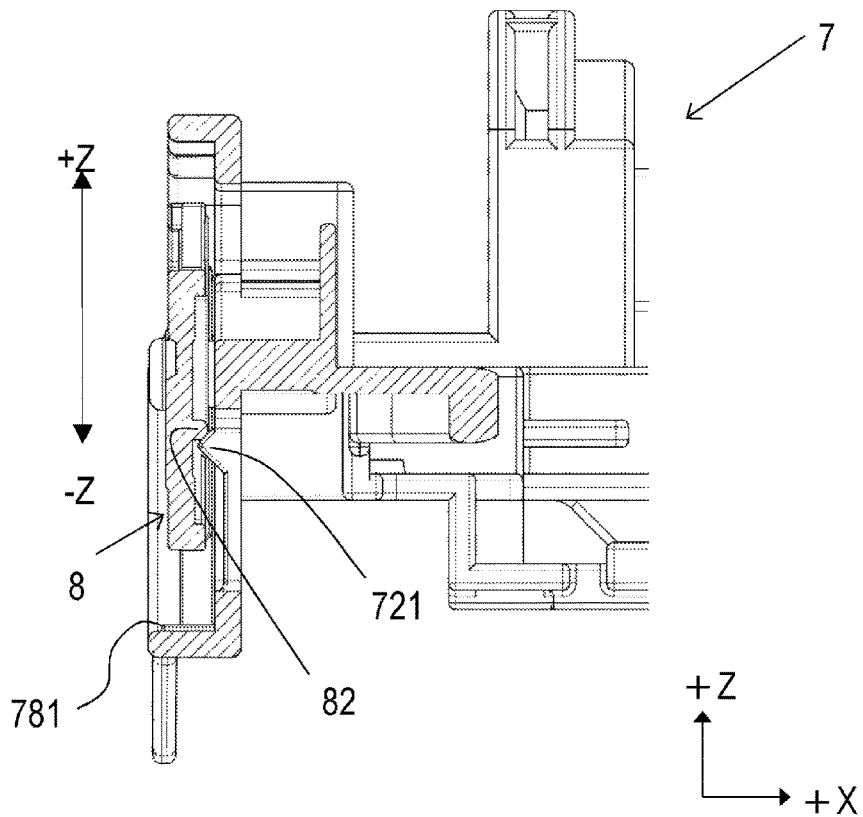

FIG. 11A shows a state in which the opening member 8 is lowered by its own weight, and this state is assumed to be the first position in this specification. FIG. 11B shows a state in which the opening member 8 gets over the biasing portion 72 and is in contact with the biasing portion 72, and is maintained above the first position in the gravity direction, and this position is assumed to be the second position in this specification. The biasing portion 72 in the drawing is a cantilever, and is a so-called snap fit having a protrusion-shaped portion 721 at its tip. That is, an end portion on a −Z side is used as a fixed end, a tip of the biasing portion 72 extending in the +Z direction is used as a free end, and the protrusion-shaped portion 721 which protrudes in the −X direction is provided at the tip. During the movement of the opening member 8 between the first position and the second position, the protrusion-shaped portion 721 comes into contact with the biased portion 82 and receives a force from the biased portion 82, the entire biasing portion 72 bends so as to escape from the biased portion 82 in a substantially horizontal direction (+X direction), and the movement of the opening member 8 to the two positions is thereby allowed. Note that the bending of the biasing portion 72 is a bending corresponding to an extremely small deformation only with the weight of the opening member 8 and the weight of the stay 20, and the opening member 8 cannot move from the second position to the first position. The weight of the reading unit 10 or a force for lifting the reading unit 10 is applied to the opening member 8 via the stay 20, and a bending which allows the position movement of the opening member 8 is thereby generated.

With reference to FIGS. 11C to 11E and FIGS. 11F to 11H, a detailed description will be given of a situation in which switching between the open state and the close state of each of the reading unit 10 and the stay 20 is performed by switching the position of the opening member 8 between the first position and the second position.

Figure 11C:
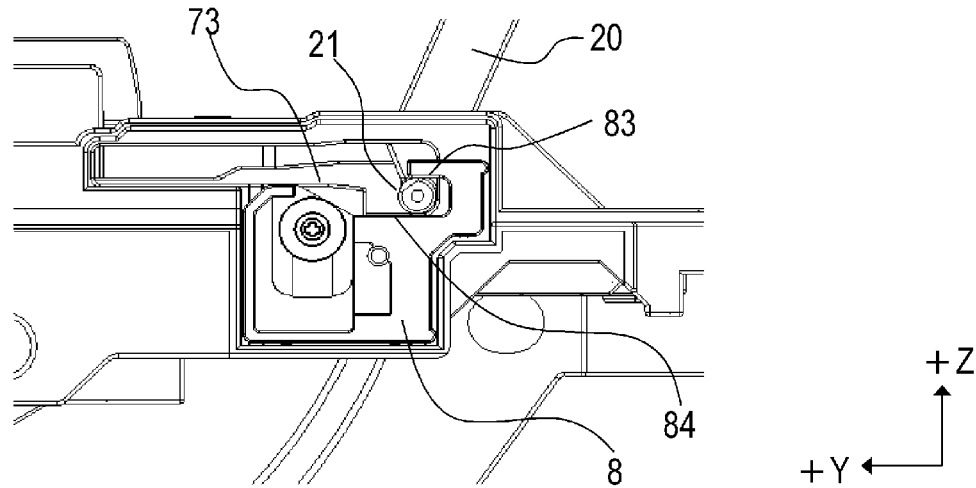
FIGS. 11C to 11E are side views each showing the position of the opening member with respect to the frame member.
Figure 11D:
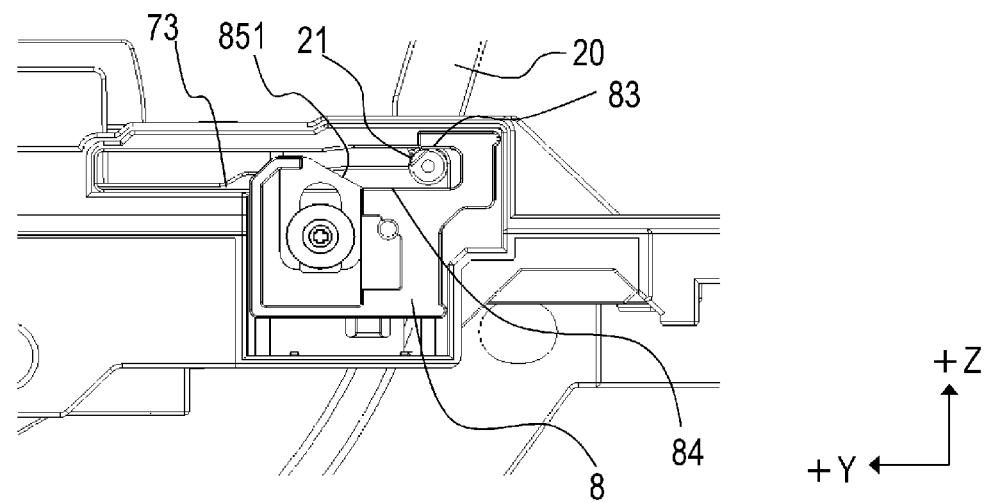
Figure 11E:
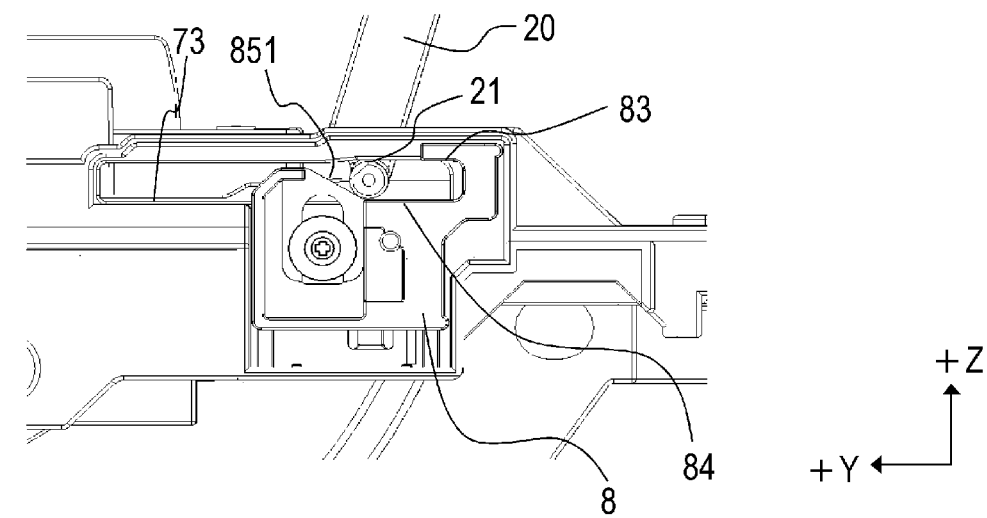

Each of FIGS. 11C to 11E is a side view on an X direction+side showing a situation of operations of the stay 20 and the opening member 8 when the state of the reading unit 10 in the open state is switched to the close state, and the situation of the change is shown in chronological order in the order of FIG. 11C, FIG. 11D, and FIG. 11E. FIG. 11C shows a situation when a user lifts the reading unit 10 in the open state upward (further rotates the reading unit 10 in the +R direction), and the holding portion 21 on the other end side of the stay 20 thereby moves to an apparatus front surface side (Y direction−side) in synchronization with the lifting operation. FIG. 11D shows a situation when the user further tries to open the reading unit 10 continuously, and the holding portion 21 of the stay 20 thereby lifts the opening member 8 and the opening member 8 thereby moves from the first position to the second position.

When the reading unit 10 is rotated from the opened state shown in FIG. 6 or the like in a direction in which open space is further widened (+R direction), the stay 20 performs rotation behavior in which the holding portion 21 moves in the −Y direction and also tries to move in the +Z direction. With this, the switching portion 83 of the opening member 8 receives a force in the +Z direction from the holding portion 21, the opening member 8 moves in the +Z direction, and the position thereof is switched from the first position to the second position. The stay 20 abuts on an upper end surface (controlling surface on a Z direction+side) of the rail portion 73 of the frame member 7, and a portion at the abutment position serves as a stopper. The lifted opening member 8 is biased and held by the protrusion-shaped portion 721 of the biasing portion 72 while being kept in the state of the second position.

As shown in FIG. 8B or the like, when the opening member 8 is at the first position, the height of the rail connection portion 84 is substantially equal to the height of a lower end support surface (controlling surface on the Z direction−side) of the holding contact portion 71 of the frame member 7. That is, when the reading unit 10 is in the opened state, the holding portion 21 of the stay 20 is supported by the holding contact portion 71 of the frame member 7 and the rail connection portion 84 of the opening member 8 from below. On the other hand, as shown in FIG. 8C or the like, when the opening member 8 moves to the second position, the rail connection portion 34 moves to a position higher than the lower end support surface of the holding contact portion 71 of the frame member 7.

FIG. 11E shows a situation in which the user releases the reading unit 10 in the state in which the opening member 8 is at the second position, and the reading unit 10 is thereby closed automatically by the weight of the reading unit 10 and rotational guiding of the stay 20 by the rail portion 73. In the rotation of the reading unit 10 to the close state (−R direction) by its own weight, the holding portion 21 of the stay 20 moves to the apparatus far side (+Y direction) by guiding by the upper end surface (controlling surface on the Z direction+side) of the rail portion 73 and the rail connection portion 84. The release portion 85 of the opening member 8 is formed into a convex shape so as to hang over the above guiding path on the downstream side of the rail connection portion 84 in the +Y direction in the guiding path. The release portion 85 has an inclined surface 851 which is configured to receive a force including a component of force in the −Z direction from the holding portion 21 when the holding portion 21 which moves in the +Y direction comes into contact with the inclined surface 851. A force acting on the biasing portion 72 from the biased portion 82 (release force) exceeds the biasing force of the biasing portion 72, and the opening member 8 is thereby caused to move in the −Z direction so as to be pushed downward by the holding portion 21. With this, the height of the tip of the protruded portion of the release portion 85 in the +Z direction is reduced to the height of the rail portion 73 of the frame member 7, the opening member 8 is moved to the first position, and it becomes possible for the holding portion 21 to move to a farther side of the rail portion 73 in the +Y direction. In this state, the reading unit 10 is brought into the closed state with respect to the lower case 2 by its own weight, and the stay 20 takes a closing posture in which the stay 20 is tilted in a substantially horizontal direction (Y direction) such that the height of the stay bearing 201 becomes substantially equal to the height of the holding portion 21. In such a closing posture, the stay 20 is stored in a storage depressed portion 122 (see FIG. 13C) provided in an area facing the frame member 7 in a lower portion of the flatbed 102.

Figure 11F:
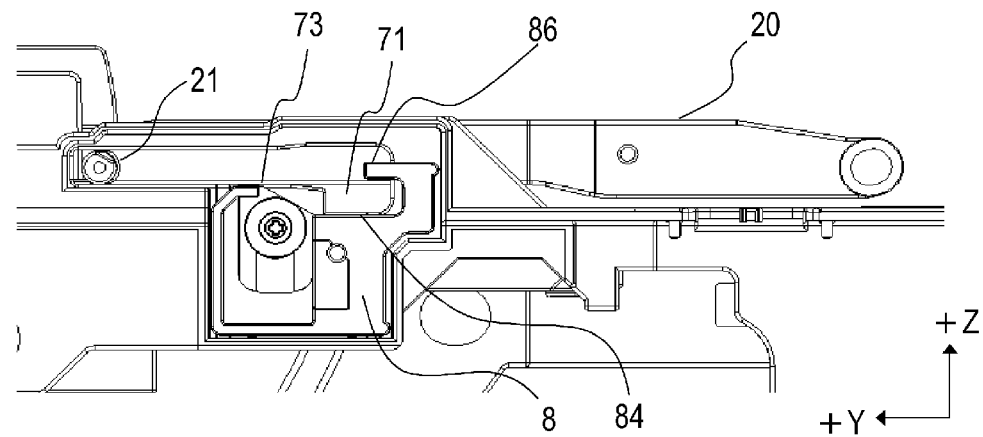
FIGS. 11F to 11H are side views each showing the position of the opening member with respect to the frame member.
Figure 11G:
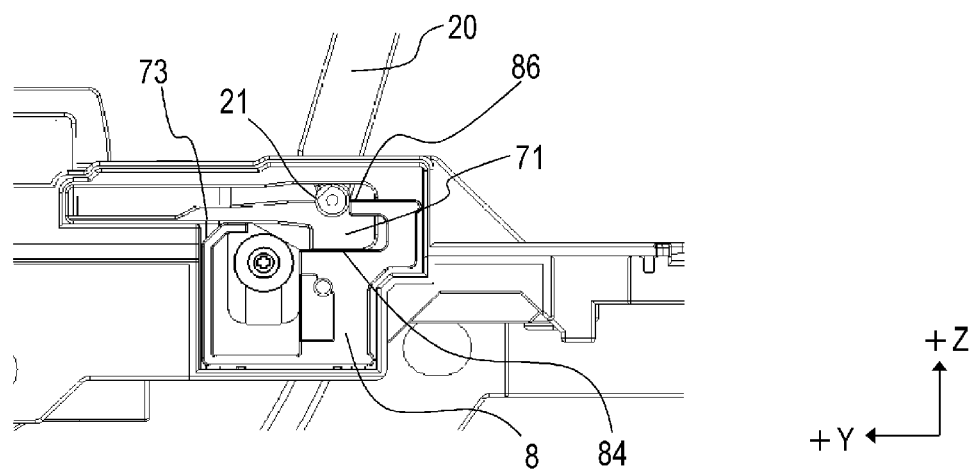
Figure 11H:
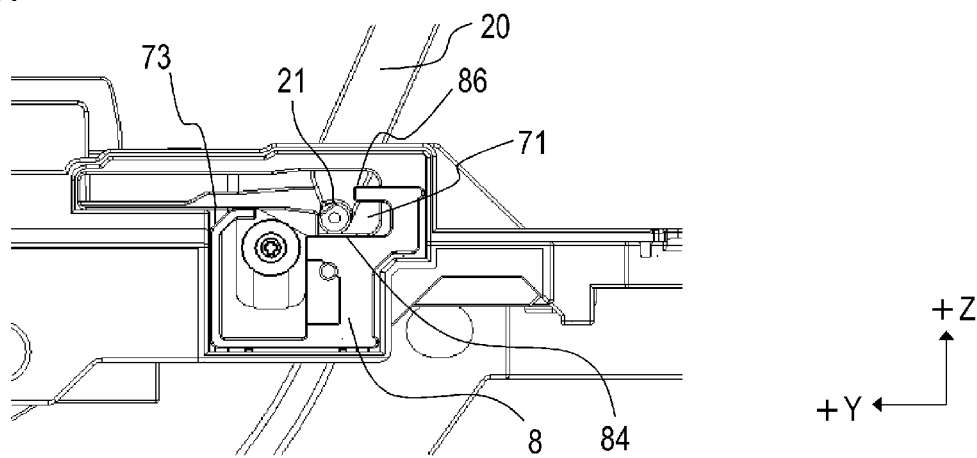

Each of FIGS. 11F to 11H is a side view on the X direction+side showing a situation of operations of the stay 20 and the opening member 8 when the state of the reading unit 10 in the close state is switched to the open state, and the situation of the change is shown in chronological order in the order of FIG. 11F, FIG. 11G, and FIG. 11H. FIG. 11F shows a state in which the reading unit 10 is closed with respect to the lower case 2. FIG. 11G shows a state in which, as the user opens the reading unit 10, the holding portion 21 of the stay 20 slides to the apparatus front surface side (−Y direction) in synchronization with the opening operation of the reading unit 10, and the holding portion 21 abuts on the abutment portion 86 of the opening member 8. When the abutment portion 86 stops the rotation of the stay 20 as a stopper, the user realizes that the reading unit 10 has reached an opening limit, and releases the reading unit 10. FIG. 11H shows a situation when the user releases the reading unit 10, and the stay 20 thereby rotates such that the holding portion 21 moves downward (moves in the −Z direction) and the holding portion 21 is thereby fitted in the holding contact portion 71. With this, the reading unit 10 is held while being in the open state with respect to the lower case 2.

First Layout Configuration

FIG. 12A is a schematic view showing the configuration of the operation portion 2a, the flatbed 102, and the frame member 7 when viewed from the apparatus front surface side. Each of FIGS. 12B and 12C is a cross-sectional view taken along the arrows a-a in FIG. 12A. FIG. 12D is a cross-sectional view taken along the arrows b-b in FIG. 12A.

The driving pulley 90, the motor 91, and the motor holder 92 for driving the sensor unit 106 are disposed at positions adjacent to a movable range (the flatbed and the ADF position) in the flatbed 102 in the moving direction (X direction) with respect to the sensor unit 106. The stay 20 is disposed at a position in an area in which the stay 20 overlaps the driving pulley 90, the motor 91, and the motor holder 92 in the moving direction and the apparatus height direction (Z direction), and is disposed on a side close to the rotation shaft 111 of the reading unit 10.

By adopting the configuration described above, it is possible to secure space for disposing the stay 20 while securing space for the lower case 2 and the opening-closing mechanism of the reading unit 10 at the same time without increasing the apparatus width and the apparatus height of the recording apparatus 1 while preventing an increase in the size of the stay 20.

Second Layout Configuration

Figure 12G:
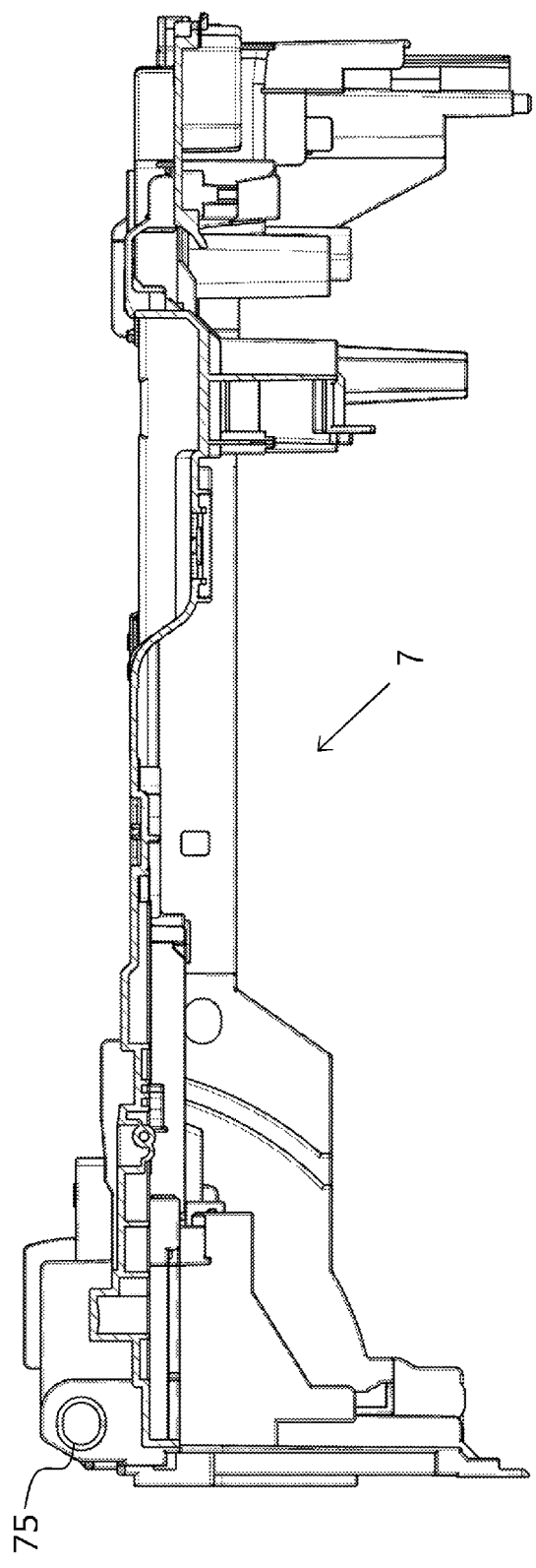

FIG. 12E is a cross-sectional view taken along the arrows b-b in FIG. 12A. Each of FIGS. 12F and 12G is a schematic view in which the cross-sectional view taken along the arrows b-b in FIG. 12A is separated into a part of the flatbed 102 and a part of the frame member 7 and the parts thereof are shown.

The stay shaft 110 (shaft portion) is provided in the flatbed 102 and, a shaft hole 201a in the shape of an elongated hole into which the stay shaft 110 is fitted is provided in the stay bearing 201 (bearing portion). The shaft hole 201a of the stay bearing 201 rotates about the stay shaft 110 when the reading unit 10 is opened or closed, and the posture of the stay 20 is thereby changed. In addition, in the flatbed 102, a stay receiving portion 112 is provided at a position facing the stay shaft 110 so as to sandwich the stay bearing 201. The stay receiving portion 112 is configured such that a depressed facing peripheral surface 112b faces an outer peripheral surface 201b of the stay bearing 201 on the Z direction+side when the reading unit 10 is in the open state. In addition, with regard to the stay shaft 110 and the stay receiving portion 112 (the facing peripheral surface 112b), play in the thickness of the stay bearing 201 is provided in a facing interval of the stay shaft 110 and the stay receiving portion 112 in an area in which the stay shaft 110 and the stay receiving portion 112 face each other.

In the case where the user applies a load to the reading unit 10 in the open state, when the load is received by the stay shaft 110, the stay shaft 110 receives the load with only one end thereof, and there is the risk of generating an excessive stress on the base of the stay shaft 110 and damaging the stay shaft 110. It is necessary to prevent damage to the stay 20 and its attachment portion. According to the above configuration of the present embodiment, when the load is applied, the depressed facing peripheral surface 112b of the stay receiving portion 112 comes into contact with the outer peripheral surface 201b of the stay bearing 201. On the other hand, an outer peripheral surface area of the stay shaft 110 is spaced from a shaft hole 201a of the stay bearing 201. That is, a portion on which the load applied to the reading unit 10 in the open state acts between the reading unit 10 and the stay 20 is positioned not between the stay shaft 110 and the stay bearing 201 but between the stay receiving portion 112 and the stay bearing 201. With this, it becomes possible to disperse the load and receive the load with the stay receiving portion 112, and it becomes possible to endure a larger load.

Third Layout Configuration

Figure 13A:
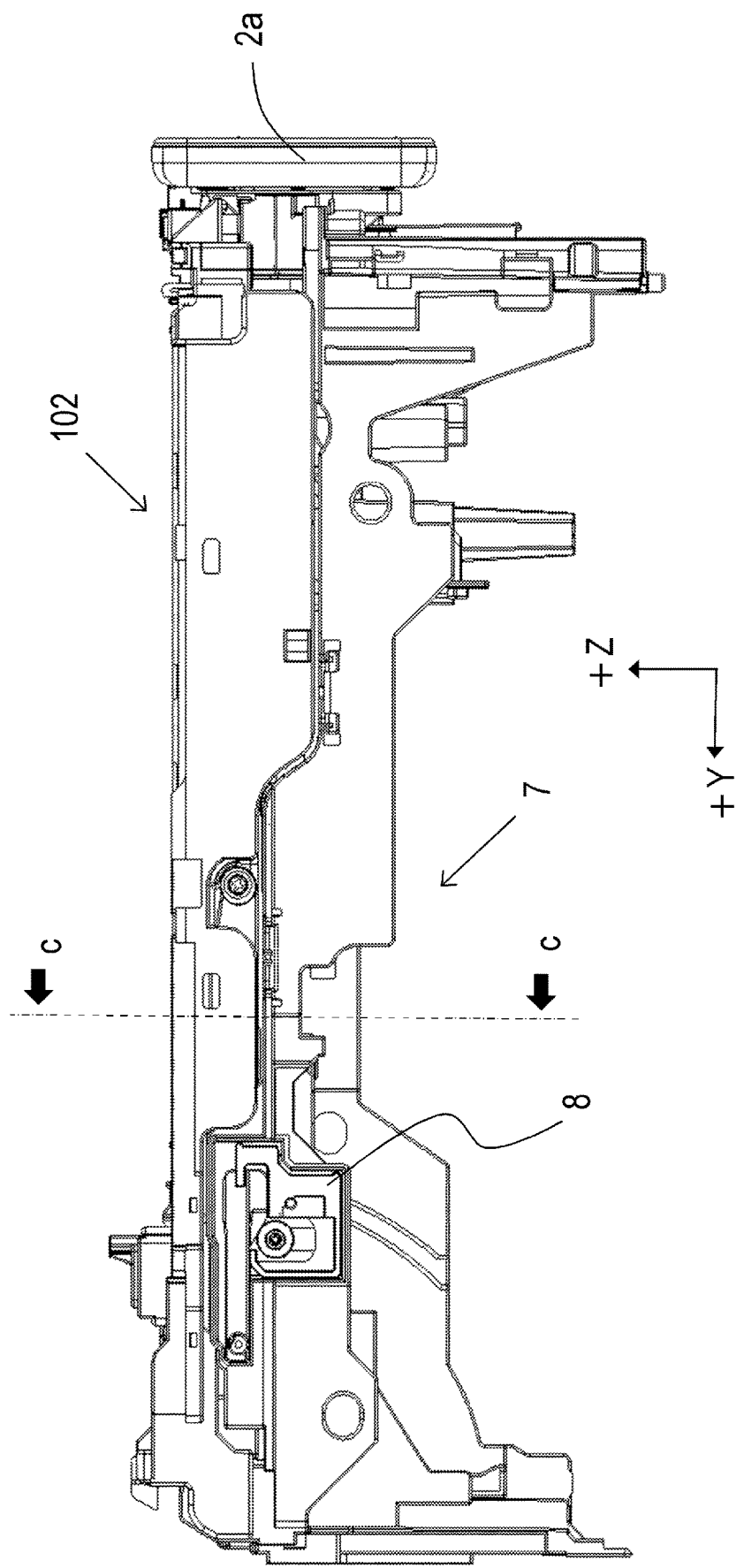
FIG. 13A is a side view of the scanner portion and the stay member.
Figure 13B:
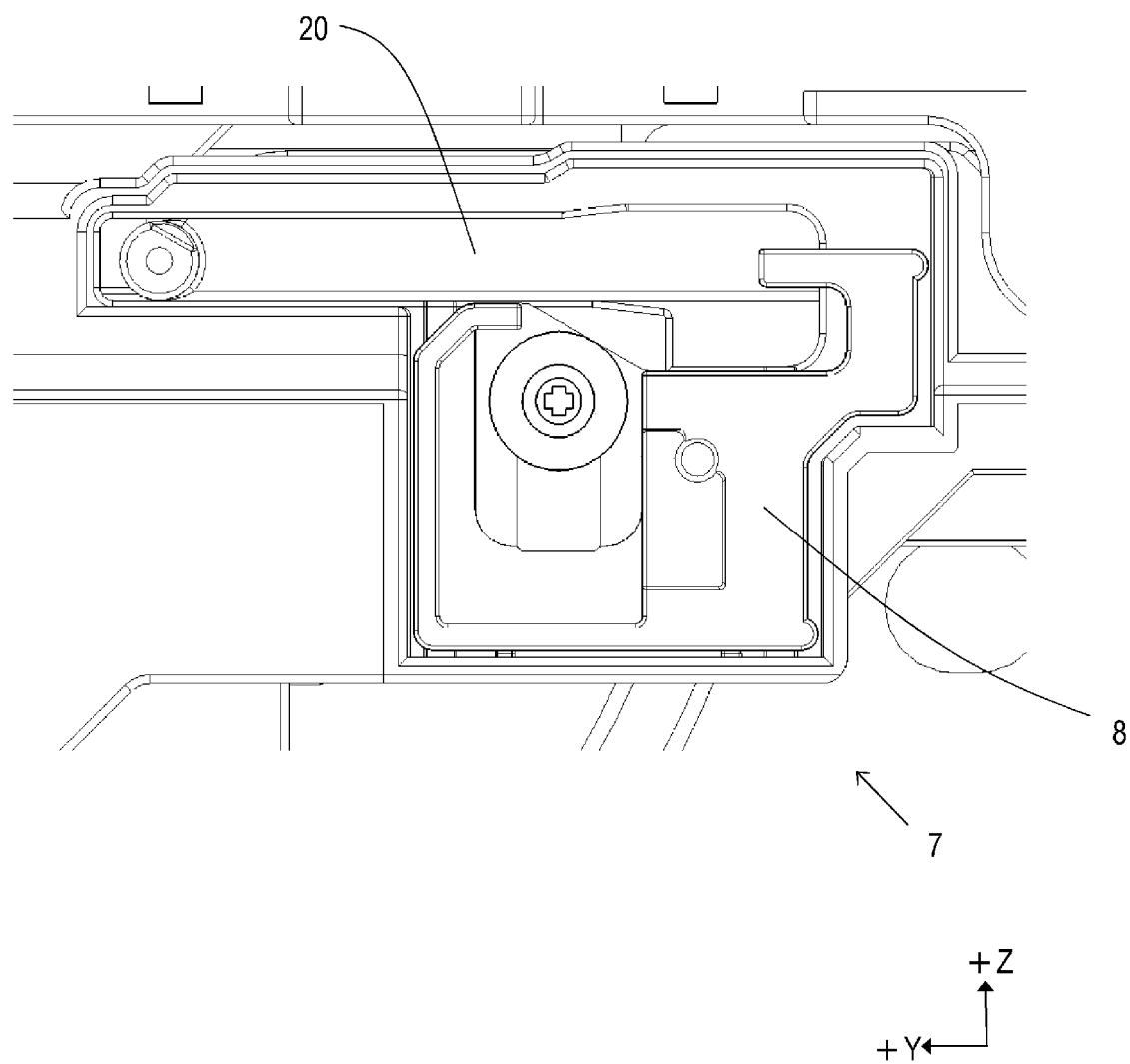
FIG. 13B is a side view of the scanner portion and the stay member.
Figure 13C:
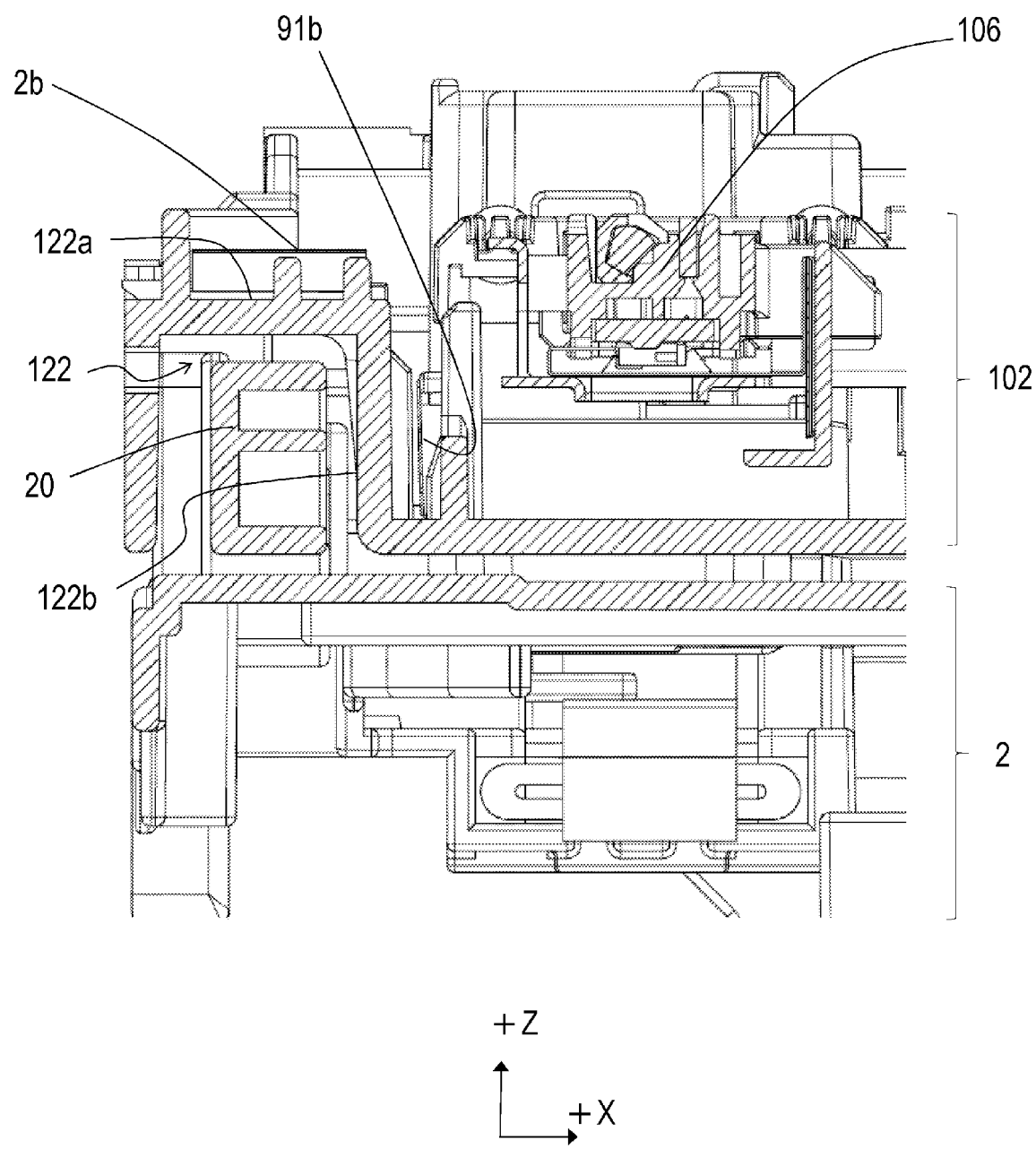
FIG. 13C is a cross-sectional view of the scanner portion, the stay member, and a flat cable.
Figure 14:
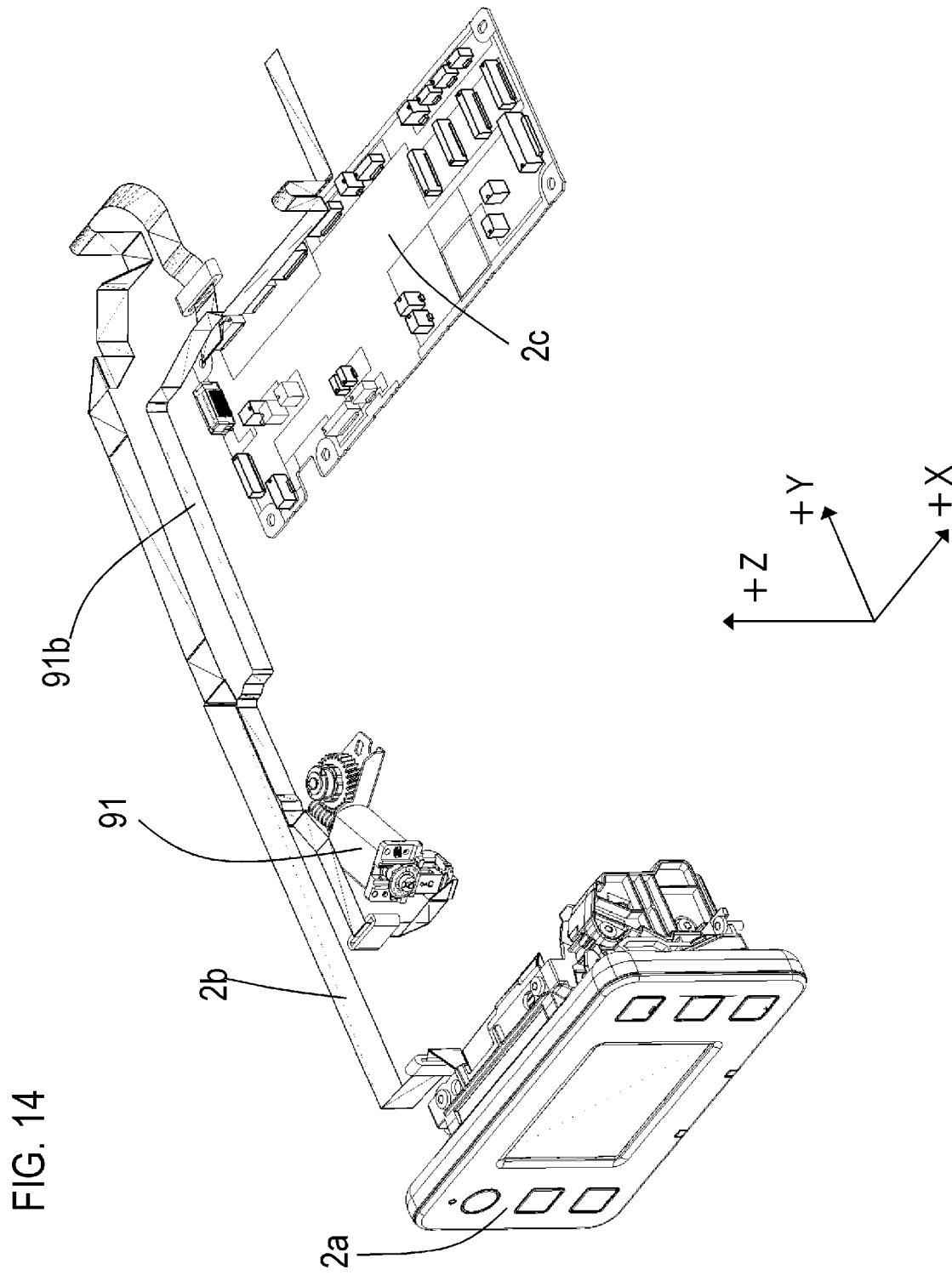
FIG. 14 is a perspective view of an operation portion, a motor, and a control board.

Each of FIGS. 13A and 13B is a schematic view showing the configuration of the operation portion 2a, the flatbed 102, and the frame member 7 when viewed from the left side surface side of the apparatus. FIG. 13C is a cross-sectional view taken along the arrows c-c in FIG. 13A. FIG. 14 is a schematic perspective view showing only the operation portion 2a, the motor 91, and the control board 2c.

The operation portion 2a is installed integrally with the flatbed 102, and the control board 2c is installed inside the lower case 2. More specifically, the operation portion 2a is disposed on the apparatus front surface side (Y direction−side), and the control board 2c is disposed on an apparatus back surface side (Y direction+side). The operation portion 2a and the control board 2c are connected to each other by a flat cable for the operation portion 2b (first flat cable), and the motor 91 and the control board 2c are connected to each other by a flat cable for the motor 91b (second flat cable). The flat cable for the operation portion 2b and the flat cable for the motor 91b are routed inside the flatbed 102 in a substantially apparatus front-rear direction (Y direction). Herein, in the close state of the reading unit 10, the flat cable for the operation portion 2b is routed inside the flatbed 102 such that its wide surface (first wide surface) faces an upper surface of the stay 20, and extends along a direction in which the upper surface extends. In addition, in the close state of the reading unit 10, the flat cable for the motor 91b is routed inside the flatbed 102 such that its wide surface (second wide surface) faces a right side surface of the stay 20 (side surface on the X direction+side), and extends along a direction in which the right side surface extends.

As shown in FIG. 13C, the storage depressed portion 122 in which the stay 20 is stored includes a first storage wall portion 122a and a second storage wall portion 122b which form a concave shape which surrounds the stored stay 20. The first storage wall portion 122a faces the stored stay 20 in the −Z direction (first direction), and extends in a longitudinal direction of the stay 20. The second storage wall portion 122b faces the stored stay 20 in the −X direction (second direction), and extends in the longitudinal direction of the stay 20. Part of the flat cable for the operation portion 2b is disposed along the first storage wall portion 122a on a side opposite (back side of) to a surface of the first storage wall portion 122a which faces the stay 20. In addition, part of the flat cable for the motor 91b is disposed along the second storage wall portion 122b on a side opposite (back side of) to a surface of the second storage wall portion 122b which faces the stay 20. With this, the flat cable for the operation portion 2b is routed inside the flatbed 102 such that its wide surface faces the stay 20 in the −Z direction, and a portion (first portion) which extends along the longitudinal direction (apparatus front-rear direction) of the stay 20 is formed. In addition, the flat cable for the motor 91b is routed inside the flatbed 102 such that its wide surface faces the stay 20 in the −X direction, and a portion (second portion) which extends along the longitudinal direction of the stay 20 is formed.

The two storage wall portions 122a and 122b constituting the storage depressed portion 122 are disposed so as to be orthogonal to each other in the present embodiment, but the storage wall portions 122a and 122b are not limited thereto, and it is only required that the storage wall portions 122a and 122b are configured to cross each other so as to form a predetermined concave shape. In addition, the directions in which the flat cables face the stay 20 are directions which are orthogonal to each other in the present embodiment, but the directions are not limited thereto, and the flat cables may face the stay 20 at different positions while effectively utilizing space around the stay 20.

When the flat cables come into contact with each other, there are cases where a malfunction such as a glitch occurs due to noises. According to the above configuration of the present embodiment, it becomes possible to route a plurality of the flat cables inside the flatbed 102 without increasing the apparatus width and the apparatus height while avoiding the contact between the flat cables.

Fourth Layout Configuration

FIG. 15A is a view when viewed from an apparatus left side surface. FIG. 15B is a cross-sectional view taken along the arrows d-d in FIG. 15A.

The transport path 101b serving as the transport mechanism is provided inside the ADF 101, and acquisition of image data is performed by reading document information transported by the transport path 101b with the sensor unit 106. In addition, the stay 20 is disposed on a side on which the transport path 101b is provided in the moving direction (X direction). The transport path 101b is constituted by a plurality of components, and the center of gravity of the ADF 101 is positioned on the side on which the transport path 101b is disposed. That is, the stay 20 is disposed in a portion in the vicinity of the center of gravity of the reading unit 10. Consequently, according to the above configuration of the present embodiment, it becomes possible to support the portion in the vicinity of the center of gravity of the reading unit 10 with the stay 20. Therefore, in a posture in which the reading unit 10 is in the open state, by supporting the portion in the vicinity of the center of gravity thereof with the stay 20, it becomes possible to stably support the reading unit 10, and it is possible to prevent deformation of the reading unit 10.

Fifth Layout Configuration

Figure 16:
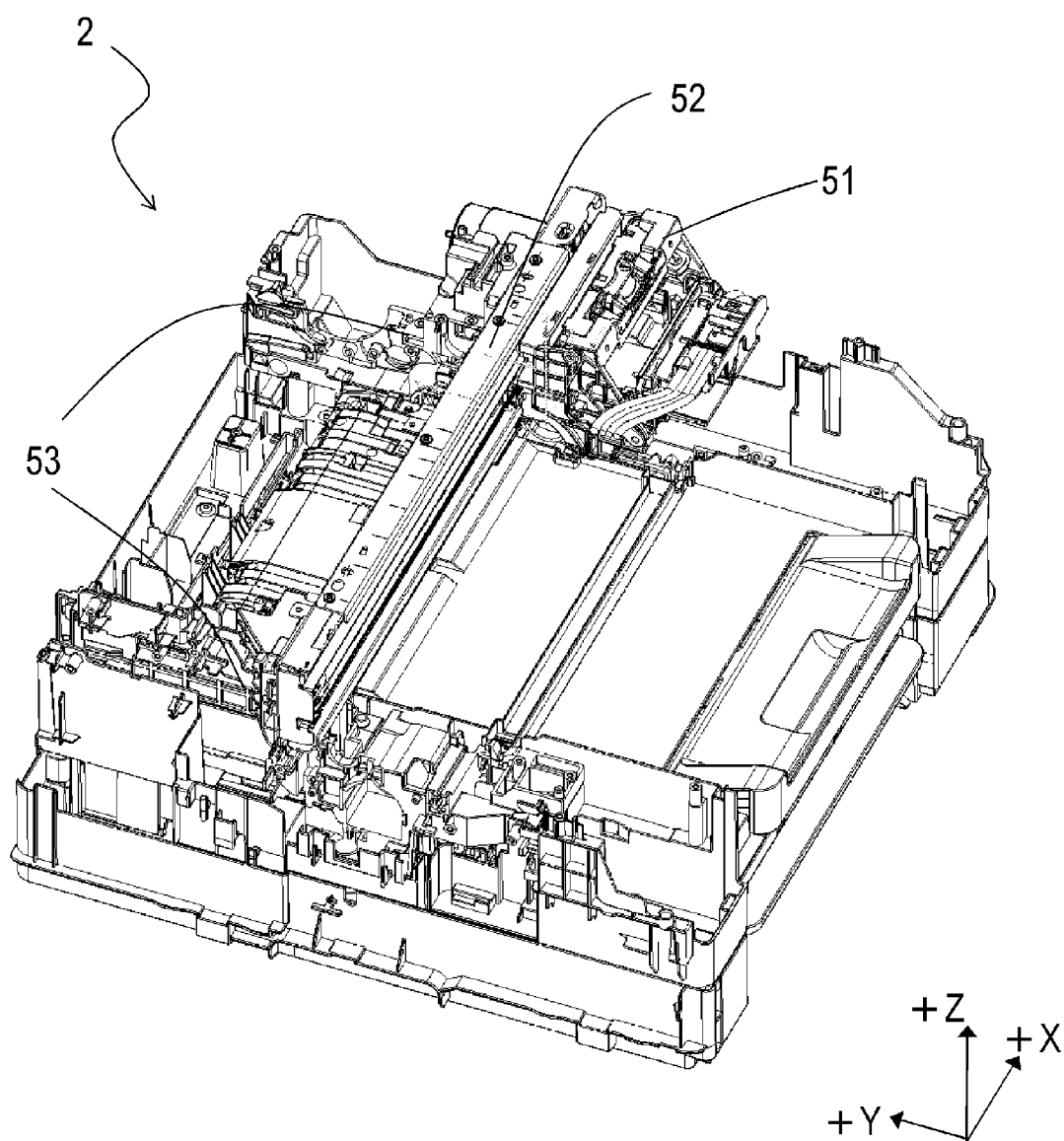
FIG. 16 is a perspective view of the printer portion.
Figure 17A:
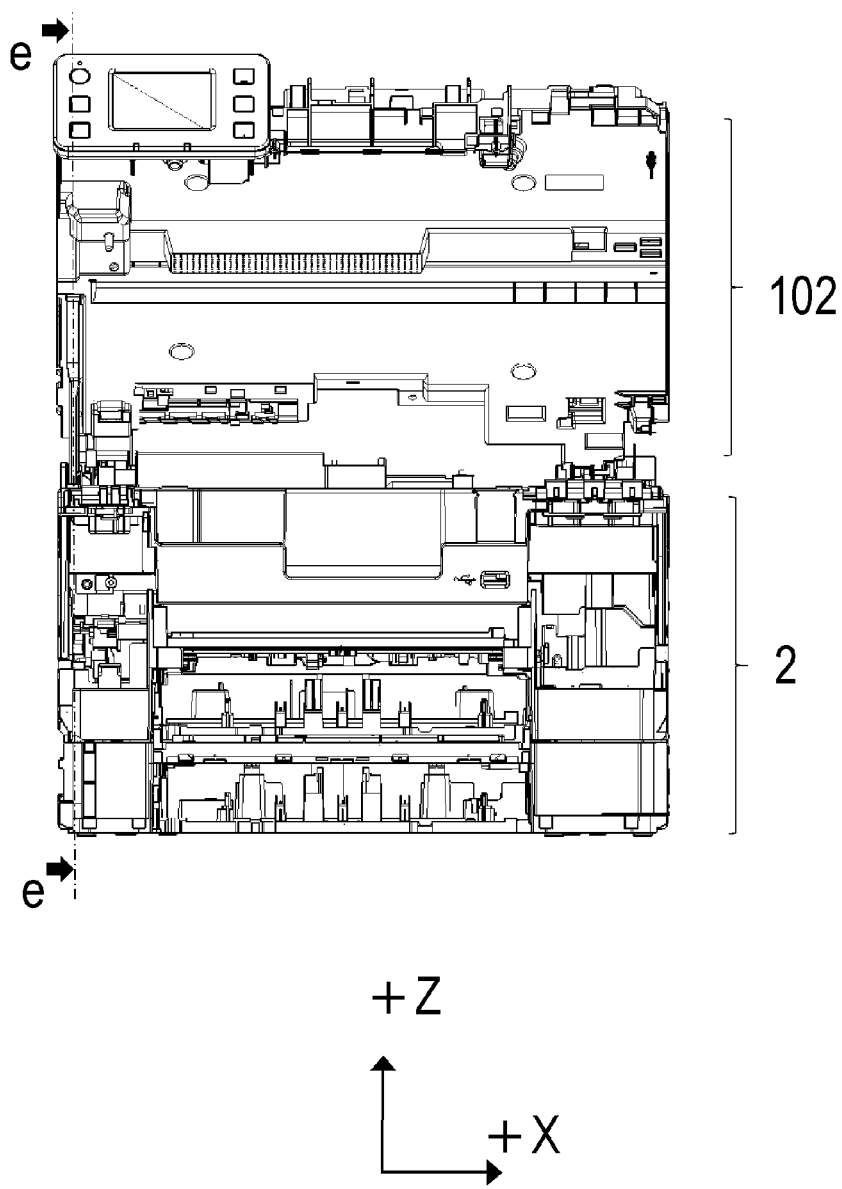
FIG. 17A is a front view of the scanner portion and the printer portion in the state in which the access portion is opened.
Figure 17B:
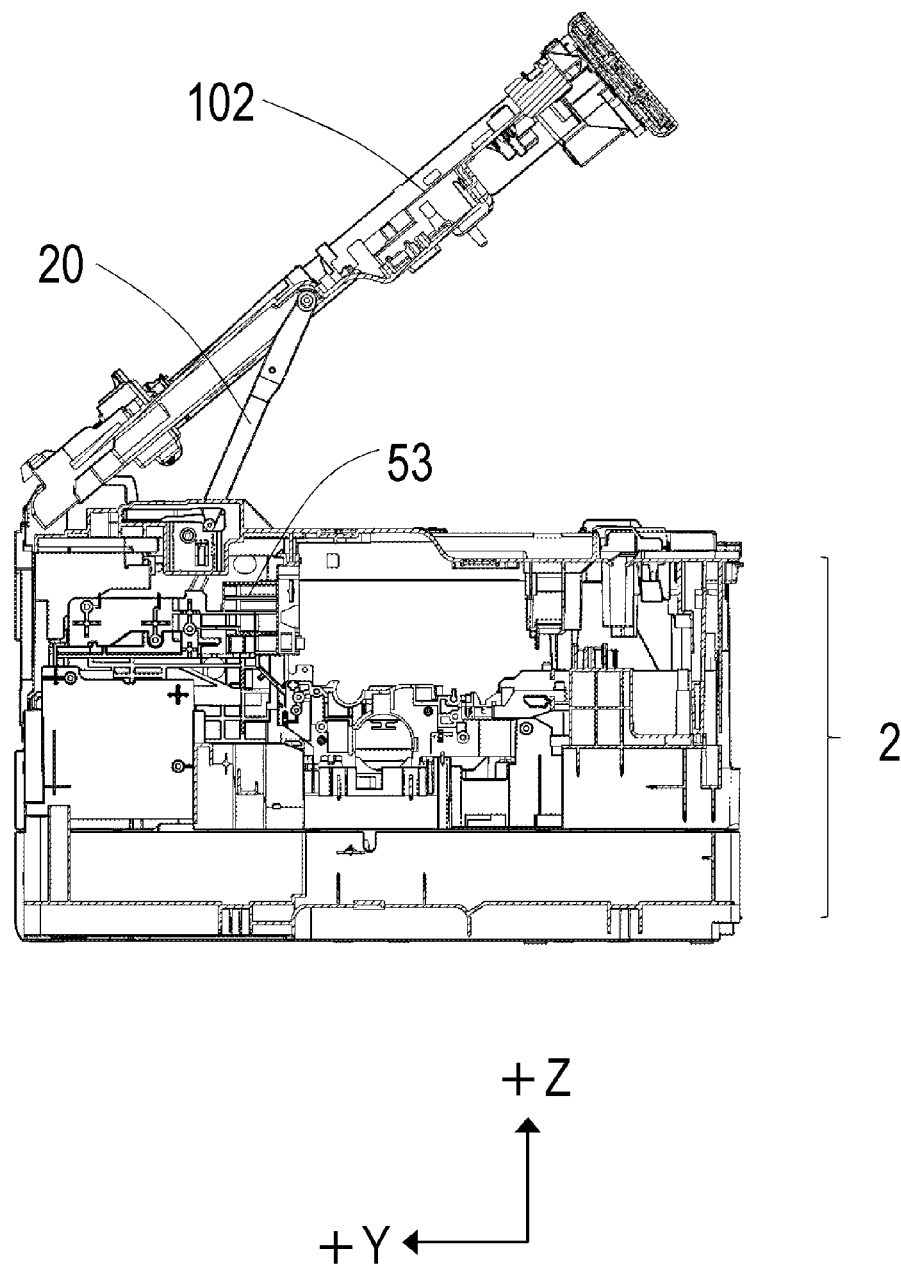
FIG. 17B is a cross-sectional view of the scanner portion and the printer portion in the state in which the access portion is opened.
Figure 17C:
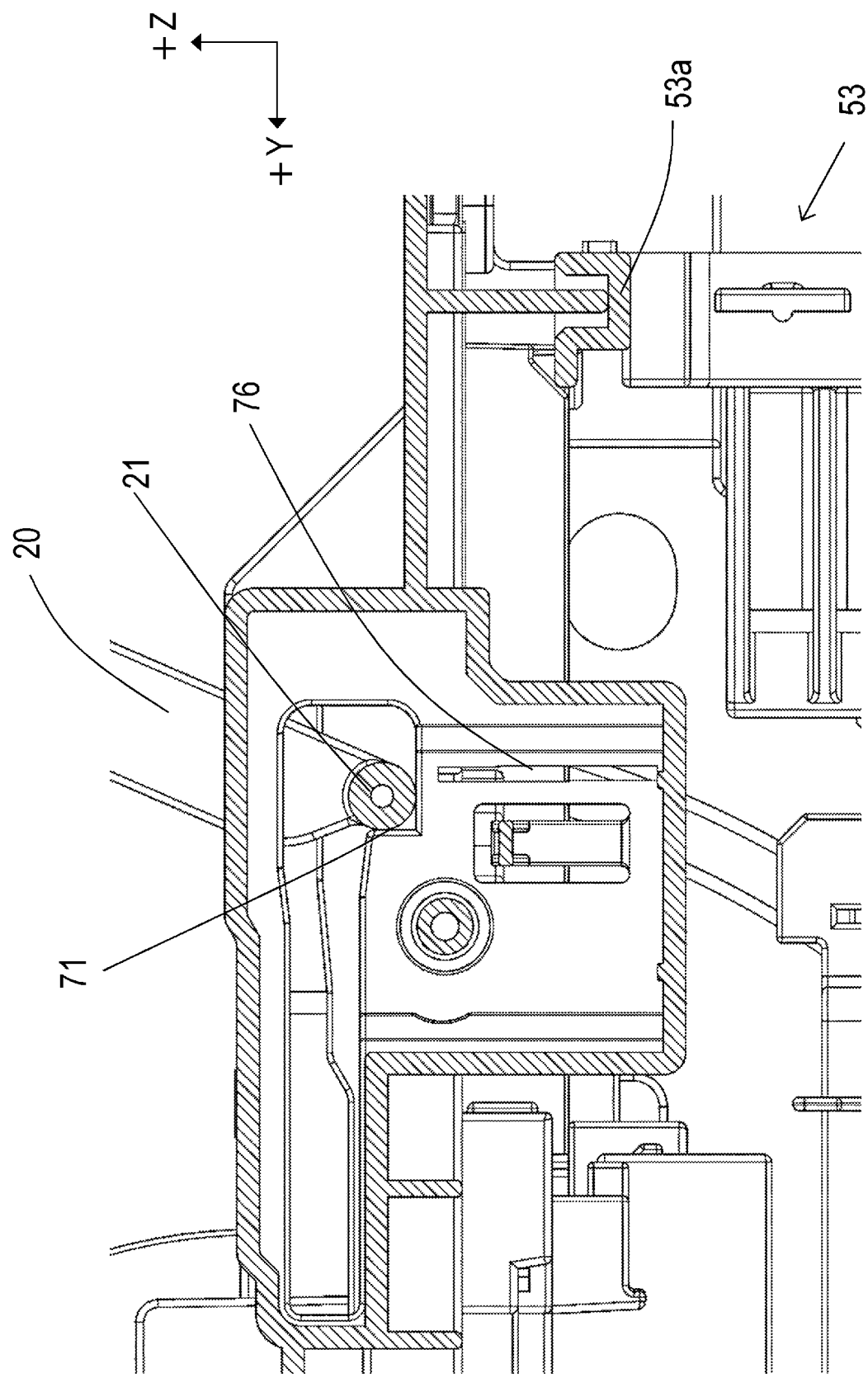
FIG. 17C is a cross-sectional view of the scanner portion and the printer portion in the state in which the access portion is opened.

FIG. 16 is a perspective view of the lower case 2. FIG. 17A is a view when viewed from an apparatus front surface in the state in which the reading unit 10 is opened. Each of FIGS. 17B and 17C is a cross-sectional view taken along the arrows e-e in FIG. 17A.

A main frame 52 is disposed so as to extend from one end side to the other end side in the moving direction (X direction) in the lower case 2, and the carriage 51 is caused to reciprocate along the main frame 52. In addition, the main frame 52 is fixed to internal holding components 53 (internal holding members) also disposed in the lower case 2. The main frame 52 and each internal holding component 53 are constituent portions having relatively high rigidity in the frame configuration of the recording apparatus 1. Herein, the holding contact portion 71 for receiving the stay 20 in the open state of the reading unit 10 is provided in the frame member 7. In the present embodiment, a frame receiving portion 53a for supporting the frame member 7 is provided in the internal holding component 53 between the apparatus front surface side (front surface side) in the apparatus front-rear direction and the holding contact portion 71.

According to the above configuration of the present embodiment, it becomes possible for the frame receiving portion 53a of the internal holding component 53 to receive a load which acts on the frame member 7 when the reading unit 10 is opened, and it is possible to prevent deformation of the frame member 7. Note that it is only required that the frame receiving portion 53a is provided in the vicinity of the holding contact portion 71, and hence the frame receiving portion 53a may also be provided between the apparatus back surface side (rear surface side) in the apparatus front-rear direction and the holding contact portion 71.

Guide Configuration of Opening Member

Figure 18A:
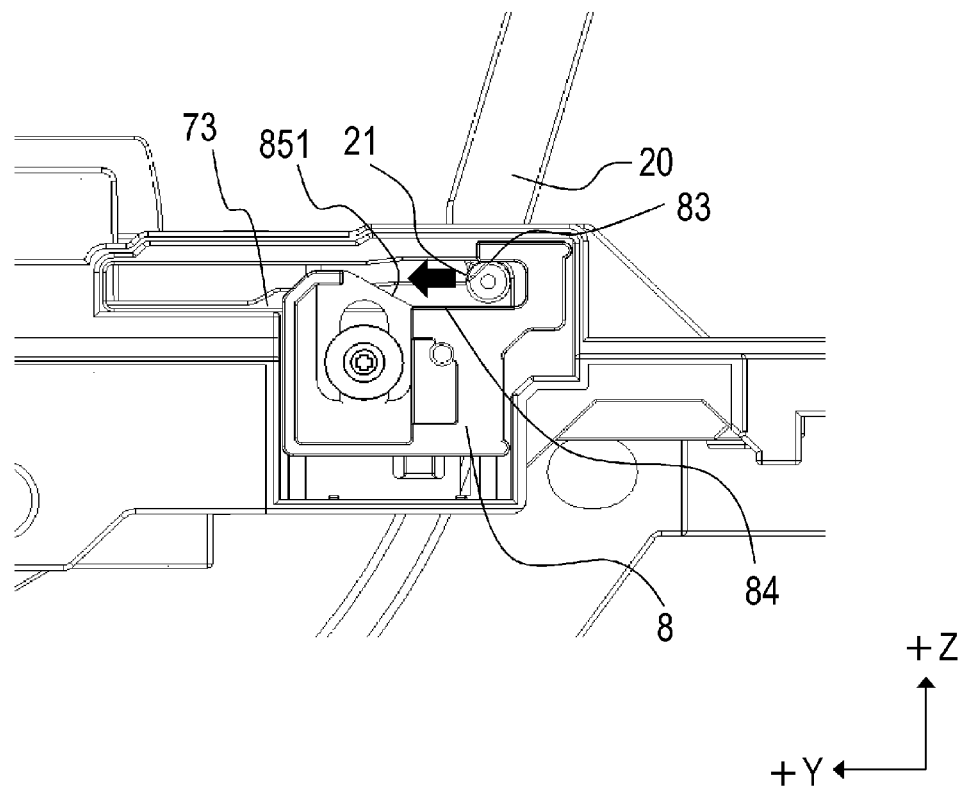
FIGS. 18A and 18B are schematic views for explaining the possibility of a malfunction of the opening member.
Figure 18B:
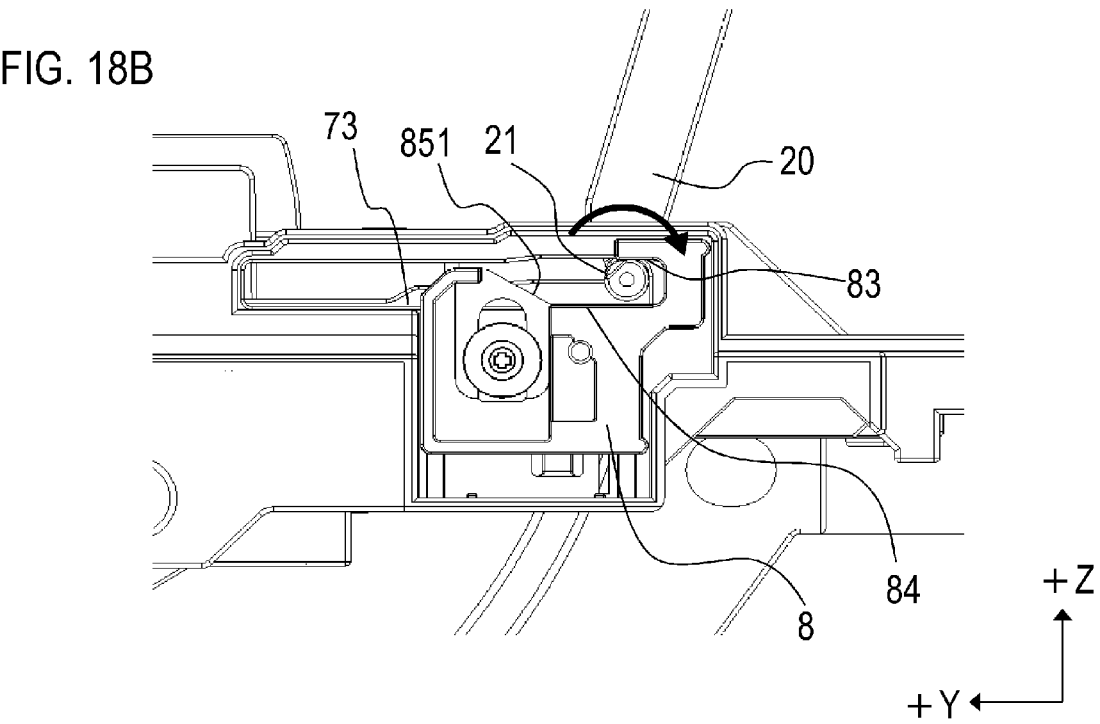

As shown in FIG. 18A, when the reading unit 10 is closed, the weight of the stay 20 is received temporarily by the opening member 8, and movement of the stay 20 to an apparatus rear side (Y direction+side) is guided. Herein, a guide portion (the guiding portion 81 and the guide hole 76) of the opening member 8 needs to be vertically operated, and hence a predetermined amount of backlash is provided. Accordingly, when the weight of the stay 20 is received by the opening member 8, there are cases where rotation shown in FIG. 18B occurs in the opening member 8 correspondingly to the backlash, and the opening member 8 is thereby tilted. This may lead to a malfunction such as the opening member 8 which is snagged on something.

Figure 19A:
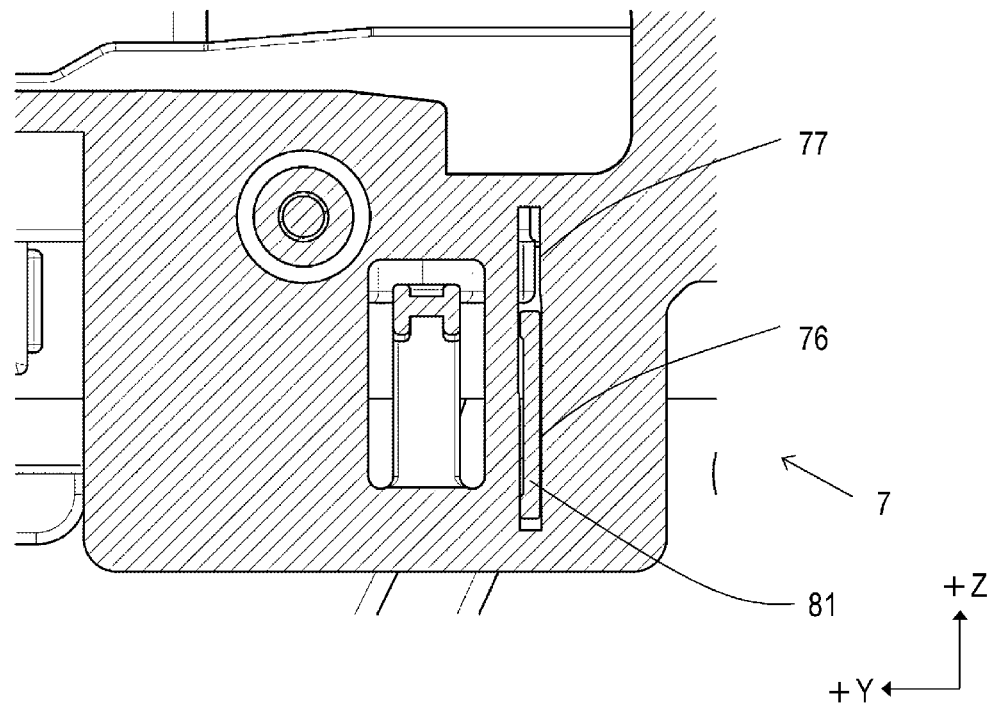
FIGS. 19A and 19B are cross-sectional views each showing the frame member and the opening member.
Figure 19B:
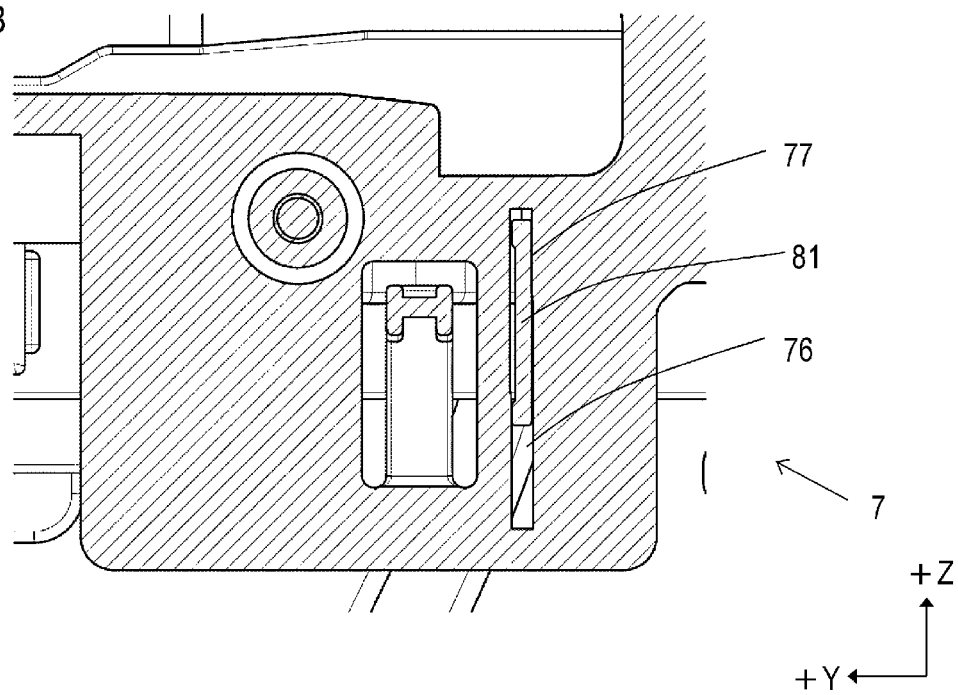

Each of FIGS. 19A and 19B is a cross-sectional view when viewed from an apparatus left side surface side, and FIG. 19A shows the case where the opening member 8 is at the first position and FIG. 19B shows the case where the opening member 8 is at the second position. Each of FIGS. 20A and 20B is a schematic view in which the guide portion (the guiding portion 81 and the guide hole 76) between the frame member 7 and the opening member 8 is enlarged and shown, and FIG. 20A shows the case where the opening member 8 is at the first position and FIG. 20B shows the case where the opening member 8 is at the second position.

In the present embodiment, protrusion-shaped portions 77a and 77b which prevent rotation of the opening member 8 with respect to the frame member 7 are provided in the guide hole 76 as predetermined guide shapes. The position guiding portion 81 engages the guide hole 76 so as to be movable in a direction (Z direction) orthogonal to a guiding direction (Y direction) in which the holding portion 21 of the stay 20 is guided by the rail portion 73.

The first protrusion-shaped portion 77a (first controlling portion) is formed so as to be able to face and contact, in the −Y direction, a first controlled portion 81a which is part of the side surface of the guide hole 76 on the Y direction+side and is also part of the side surface of the position guiding portion 81 on the Y direction+side. The first protrusion-shaped portion 77a and the first controlled portion 81a are configured to always face each other in the Y direction irrespective of the position of the opening member 8.

The second protrusion-shaped portion 77b (second controlling portion) is formed so as to be able to face and contact, in the +Y direction, a second controlled portion 81b which is part of the side surface of the guide hole 76 on the Y direction−side and is also part of the side surface of the position guiding portion 81 on the Y direction−side. The second protrusion-shaped portion 77b and the second controlled portion 81b are configured not to face each other in the Y direction in the case where the opening member 8 is at the first position, and are configured to face each other in the Y direction when the opening member 8 moves to the second position.

That is, when the opening member 8 is at the second position, the position of the position guiding portion 81 in the Y direction is controlled by the first protrusion-shaped portion 77a and the second protrusion-shaped portion 77b from both sides in the Y direction. Accordingly, when the opening member 8 moves from the second position to the first position by the load which acts from the stay 20 when the reading unit 10 is closed, the occurrence of unnecessary rotation in the opening member 8 is prevented. In the process of change of the position of the opening member 8 from the second position to the first position, the control by the second protrusion-shaped portion 77b is stopped, and only the first protrusion-shaped portion 77a and the first controlled portion 81a are in contact with each other. With this, an operation in which the opening member 8 of which the engagement of the biasing portion 72 is disengaged moves to the first position by its own weight is smoothly performed.

According to the above configuration of the present embodiment, when the opening member 8 is at the second position, it is possible to prevent the unnecessary rotation of the opening member 8 with respect to the frame member 7, and improve stability of the operation of the opening member 8.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023609, filed on Feb. 17, 2021, which is hereby incorporated by reference herein in its entirety.

What is claimed is:

1. A reading apparatus comprising:
a lower case;
a reading portion configured to move, above the lower case in a height direction about a rotation axis, between an open position in which the lower case is open and a closed position in which the lower case is closed, and accommodate a reading sensor for reading an image from a document;
a motor portion including a motor provided in the reading portion and configured to move the reading sensor in a moving direction; and
a stay coupled to the reading portion rotatably at a rotary portion in one end, and coupled to the lower case rotatably and so as to be able to move a position of a rotation shaft with respect to the lower case in a direction orthogonal to the rotation shaft in the other end; wherein
the motor is located outside a movable range of the reading sensor in the moving direction, and
when the reading portion is in the closed position, the stay is disposed in an area in which the stay overlaps the motor when viewed along the moving direction and the rotary portion of the stay overlaps the motor when viewed along the height direction.

2. The reading apparatus according to claim 1, further comprising:
a first flat cable provided in the reading portion and configured to face the stay in a first direction; and
a second flat cable provided in the reading portion and configured to face the stay in a second direction crossing the first direction.

3. The reading apparatus according to claim 2, further comprising:
an operation portion provided integrally with the reading portion and configured to allow a user to operate the reading apparatus; and
a control board provided in the lower case;
wherein
the first flat cable connects the operation portion and the control board, and
the second flat cable connects the motor portion and the control board.

4. The reading apparatus according to claim 3, wherein
the operation portion is disposed on an apparatus front surface side in an apparatus front-rear direction,
the control board is disposed on an apparatus back surface side in the apparatus front-rear direction, and
the stay extends in the apparatus front-rear direction when the reading portion is in the closed position.

5. The reading apparatus according to claim 2, further comprising:
a first storage wall portion provided in the reading portion and configured to face the stay in the first direction and extend in a longitudinal direction of the stay when the reading portion is in the closed portion; and
a second storage wall portion provided in the reading portion and configured to face the stay in the second direction and extend in the longitudinal direction when the reading portion is in the closed portion.

6. The reading apparatus according to claim 1, wherein
the reading portion has a shaft portion rotatably supporting the one end of the stay and a receiving portion facing the shaft portion, and
the rotary portion of the stay includes a shaft hole into which the shaft portion is inserted at the one end and has a bearing portion disposed so as to be held between the shaft portion and the receiving portion.

7. The reading apparatus according to claim 1, wherein
the reading portion includes a document transport portion having a transport mechanism for transporting the document, and
the stay is disposed on a side, on which the transport mechanism is disposed, in an apparatus width direction.

8. The reading apparatus according to claim 1, wherein
the lower case includes:
a frame member having a rail portion for guiding the other end of the stay; and
an opening member provided in the frame member so as to be movable in a first direction orthogonal to a guiding direction of the other end by the rail portion, wherein
the opening member is configured to be able to take, by a force received from the other end of the stay, a first position allowing the other end of the stay to move to a position at which the other end is held, and a second position bringing the other end into a state in which the other end is not held.

9. The reading apparatus according to claim 8, wherein
the opening member has a guided protrusion,
the frame member has a guide hole engaged by the guided protrusion and guides movement of the opening member in the first direction,
the guide hole has a first controlling portion which is able to come into contact with the guided protrusion on one side in the guiding direction and a second controlling portion which is able to come into contact with the guided protrusion on the other side in the guiding direction, the first controlling portion is provided on one side of the guide hole in the first direction and the second controlling portion is provided on the other side of the guide hole in the first direction, only the first controlling portion faces the guided protrusion in the guiding direction when the opening member is at the first position, and both of the first controlling portion and the second controlling portion face the guided protrusion in the guiding direction when the opening member is at the second position.

10. The reading apparatus according to claim 8, wherein the opening member is disposed in an area in which the opening member overlaps the motor portion when viewed along the height direction.

11. The reading apparatus according to claim 1, wherein the lower case is provided with a recording portion for recording an image on a recording material.

12. The reading apparatus according to claim 11, wherein the lower case includes a frame member including a rail portion for guiding the other end of the stay and an internal holding member for holding the recording portion, the rail portion includes a holding contact portion for holding the other end of the stay when the reading portion is in an open state, and the internal holding member has a frame receiving portion for supporting the frame member on a front surface side or a back surface side in an apparatus front-rear direction with respect to the holding contact portion.

13. The reading apparatus according to claim 1, wherein the rotary portion is a bearing or a stay shaft.

14. The reading apparatus according to claim 1, wherein the motor portion further includes a motor shaft.

15. The reading apparatus according to claim 1, wherein in case the reading portion is in the closed position, the stay is stored in a depressed portion of the reading portion and is disposed between the rotation axis and the motor.

16. A recording apparatus comprising:
a recording portion configured to record an image on a recording material;
a lower case provided in the recording portion;
a reading portion configured to move, above the lower case in a height direction about a rotation axis, between an open position in which the lower case is open and a closed position in which the lower case is closed, and accommodate a reading sensor for reading the image from a document;
a motor portion including a motor provided in the reading portion and configured to move the reading sensor in a moving direction; and
a stay coupled to the reading portion rotatably at a rotary portion in one end, and coupled to the lower case rotatably and so as to be able to move a position of a rotation shaft with respect to the lower case in a direction orthogonal to the rotation shaft in the other end, wherein
the motor is located outside a movable range of the reading sensor in the moving direction, and
when the reading portion is in the closed position, the stay is disposed in an area in which the stay overlaps the motor when viewed along the moving direction and the rotary portion of the stay overlaps the motor when viewed along the height direction.

17. The recording apparatus according to claim 16, wherein
the reading portion has a shaft portion rotatably supporting the one end of the stay and a receiving portion facing the shaft portion, and
the rotary portion of the stay includes a shaft hole into which the shaft portion is inserted at the one end and has a bearing portion disposed so as to be held between the shaft portion and the receiving portion.

18. The recording apparatus according to claim 16, wherein
the reading portion includes a document transport portion having a transport mechanism for transporting the document, and
the stay is disposed on a side, on which the transport mechanism is disposed, in an apparatus width direction.

19. The recording apparatus according to claim 16, wherein
the lower case includes:
a frame member having a rail portion for guiding the other end of the stay; and
an opening member provided in the frame member so as to be movable in a first direction orthogonal to a guiding direction of the other end by the rail portion, wherein
the opening member is configured to be able to take, by a force received from the other end of the stay, a first position allowing the other end of the stay to move to a position at which the other end is held, and a second position bringing the other end into a state in which the other end is not held.

20. The recording apparatus according to claim 19, wherein
the opening member has a guided protrusion,
the frame member has a guide hole engaged by the guided protrusion and guides movement of the opening member in the first direction,
the guide hole has a first controlling portion which is able to come into contact with the guided protrusion on one side in the guiding direction and a second controlling portion which is able to come into contact with the guided protrusion on the other side in the guiding direction,
the first controlling portion is provided on one side of the guide hole in the first direction and the second controlling portion is provided on the other side of the guide hole in the first direction,
only the first controlling portion faces the guided protrusion in the guiding direction when the opening member is at the first position, and
both of the first controlling portion and the second controlling portion face the guided protrusion in the guiding direction when the opening member is at the second position.

21. The recording apparatus according to claim 19, wherein
the opening member is disposed in an area in which the opening member overlaps the motor portion when viewed along the height direction.

22. The recording apparatus according to claim 16, wherein
the rotary portion is a bearing or a stay shaft.

23. The recording apparatus according to claim 16, wherein
the motor portion further includes a motor shaft.

24. The recording apparatus according to claim 16, wherein
in case the reading portion is in the closed position, the stay is stored in a depressed portion of the reading portion and is disposed between the rotation axis and the motor.

\* \* \* \* \*